(12) United States Patent
O'Young et al.

(10) Patent No.: US 12,276,721 B2
(45) Date of Patent: Apr. 15, 2025

(54) METHOD AND APPARATUS FOR DETERMINING A POSITION OF AN AIRBORNE VEHICLE USING SECONDARY SURVEILLANCE RADARS AS BEACONS

(71) Applicant: Seamatica Aerospace Ltd., St. John's (CA)

(72) Inventors: Siu Donald O'Young, St. John's (CA); Yake Li, Ottawa (CA)

(73) Assignee: Seamatica Aerospace Ltd., St. John's (CA)

(*) Notice: Subject to any disclaimer, the term of this patent is extended or adjusted under 35 U.S.C. 154(b) by 416 days.

(21) Appl. No.: 17/730,156

(22) Filed: Apr. 26, 2022

(65) Prior Publication Data

US 2022/0268917 A1 Aug. 25, 2022

Related U.S. Application Data

(63) Continuation-in-part of application No. 17/577,250, filed on Jan. 17, 2022, which is a continuation-in-part of application No. 16/276,053, filed on Feb. 14, 2019, now Pat. No. 11,226,410.

(60) Provisional application No. 63/179,901, filed on Apr. 26, 2021, provisional application No. 63/179,929, filed on Apr. 26, 2021, provisional application No. 62/630,362, filed on Feb. 14, 2018.

(51) Int. Cl.
*G01S 13/78* (2006.01)
*G08G 5/00* (2006.01)

(52) U.S. Cl.
CPC .......... *G01S 13/781* (2013.01); *G08G 5/0008* (2013.01); *G08G 5/0013* (2013.01)

(58) Field of Classification Search
CPC .... G01S 13/781; G01S 13/762; G01S 13/933; G01S 13/765; G08G 5/0008; G08G 5/0013; G08G 5/0078; G08G 5/0082
USPC ................... 342/32, 37, 455, 29, 30, 36, 39
See application file for complete search history.

(56) References Cited

U.S. PATENT DOCUMENTS

| | | | |
|---|---|---|---|
| 2,588,916 A | 3/1952 | Field | |
| 3,875,570 A * | 4/1975 | Litchford | G01S 13/781 342/455 |
| 3,895,382 A * | 7/1975 | Litchford | G01S 13/781 342/455 |
| 4,021,802 A * | 5/1977 | Litchford | G01S 13/781 342/455 |
| 4,027,307 A | 5/1977 | Litchford | |
| RE29,260 E | 6/1977 | Litchford | |
| 4,060,805 A * | 11/1977 | McComas | G08G 5/0013 342/44 |

(Continued)

OTHER PUBLICATIONS

DO-365 "Minimum Operational Performance Standards (MOPS) for Detect and Avoid (DAA) System", Appendix C, RTCA, May 31, 2017, pp. C1-C6.

(Continued)

*Primary Examiner* — Vladimir Magloire
*Assistant Examiner* — Michael W Justice
(74) *Attorney, Agent, or Firm* — IP-MEX Inc.; Victoria Donnelly

(57) ABSTRACT

Methods and systems are disclosed for determining a spatial position of an aircraft, without replying on measurements from the Global Positioning System. Various embodiments are described using a single Secondary Surveillance Radar (SSR), and multiple SSRs.

23 Claims, 14 Drawing Sheets

(56) References Cited

U.S. PATENT DOCUMENTS

| | | | | |
|---|---|---|---|---|
| 4,109,248 | A | 8/1978 | Knowles et al. | |
| 4,115,771 | A | 9/1978 | Litchford | |
| 4,128,839 | A | 12/1978 | McComas | |
| 4,196,434 | A * | 4/1980 | Funatsu | G01S 13/933 342/455 |
| 4,293,857 | A | 10/1981 | Baldwin | |
| 4,319,243 | A | 3/1982 | Vachenauer et al. | |
| 4,481,349 | A | 11/1984 | Marten et al. | |
| 4,486,755 | A * | 12/1984 | Hulland | G01S 13/781 342/455 |
| 4,642,648 | A * | 2/1987 | Hulland | G01S 13/79 342/455 |
| 4,782,450 | A * | 11/1988 | Flax | G01S 13/933 342/32 |
| 4,910,526 | A * | 3/1990 | Donnangelo | G01S 13/781 342/455 |
| 5,075,694 | A * | 12/1991 | Donnangelo | G01S 13/933 342/455 |
| 5,081,457 | A | 1/1992 | Motisher | |
| 5,140,328 | A * | 8/1992 | Litchford | G01S 13/781 342/465 |
| 5,173,706 | A | 12/1992 | Urkowitz | |
| 5,196,856 | A | 3/1993 | Litchford et al. | |
| 5,198,823 | A * | 3/1993 | Litchford | G01S 13/762 342/429 |
| 5,223,847 | A | 6/1993 | Minter | |
| 5,239,310 | A | 8/1993 | Meyers | |
| 5,506,590 | A | 4/1996 | Minter | |
| 6,285,318 | B1 | 9/2001 | Schoen | |
| 6,344,820 | B1 | 2/2002 | Shiomi et al. | |
| 6,985,103 | B2 | 1/2006 | Ridderheim et al. | |
| 7,006,032 | B2 | 2/2006 | King | |
| 7,570,194 | B2 | 8/2009 | Galati | |
| 7,800,541 | B2 | 9/2010 | Moshfeghi | |
| 9,218,741 | B2 | 12/2015 | Wu | |
| 9,250,317 | B1 | 2/2016 | Wang | |
| 9,291,699 | B2 | 3/2016 | Sadr et al. | |
| 9,658,325 | B2 * | 5/2017 | Harvey | G01S 13/26 |
| 9,734,723 | B1 | 8/2017 | Bruno et al. | |
| 9,881,506 | B1 * | 1/2018 | Gentry | H04W 76/10 |
| 10,339,819 | B1 * | 7/2019 | Gentry | H04B 7/18506 |
| 10,743,141 | B2 | 8/2020 | Fairbanks et al. | |
| 11,313,960 | B2 * | 4/2022 | Yamanouchi | G01S 13/42 |
| 2005/0156777 | A1 | 7/2005 | King | |
| 2008/0039988 | A1 | 2/2008 | Estabrook | |
| 2013/0009823 | A1 | 1/2013 | Wang | |
| 2013/0176163 | A1 | 7/2013 | Margolin | |
| 2015/0331099 | A1 | 11/2015 | Wu | |
| 2016/0025849 | A1 | 1/2016 | Wang | |
| 2016/0033630 | A1 * | 2/2016 | Harvey | G01S 13/781 342/43 |
| 2018/0172797 | A1 | 6/2018 | Hauswald et al. | |
| 2018/0204469 | A1 | 7/2018 | Moster | |

OTHER PUBLICATIONS

"Minimum Operational Performance Standards for Air Traffic Control Radar Beacon System / Mode Select (ATCRBS / Mode S) Airborne Equipment", RTCA, Inc., RTCA DO-181E, Washington, DC, Mar. 17, 2011.

RTCA Paper No. 256-20/SC228-076, "Minimum Operational Performance Standards (MOPS) for Detect and Avoid (DAA) Systems", RTCA DO-365B, Prepared by SC-228 (Sep. 16, 2020), online: www.rtca.org.

Shiomi et al, "Development of Mobile Passive Secondary Surveillance Radar", ICAS 2012, 28th International Congress of the Aeronautical Sciences, pp. 1-6.

Shiomi et al, "Development of Passive Surveillance Radar", ICAS 2014, 29th Congress of the International Council of the Aeronautical Sciences, pp. 1-9.

* cited by examiner

METHOD AND APPARATUS FOR DETERMINING A POSITION OF AN AIRBORNE VEHICLE USING SECONDARY SURVEILLANCE RADARS AS BEACONS

RELATED APPLICATIONS

The present application (SEA-006-US) claims benefit from U.S. provisional patent application, Ser. No. 63/179,901, filed on Apr. 26, 2021 (SEA-006-US-prov).

The present application (SEA-006-US) claims benefit from U.S. provisional patent application, Ser. No. 63/179,929, filed on Apr. 26, 2021 (SEA-007-US-prov The present application (SEA-006-US) is also a continuation-in-part of U.S. patent application Ser. No. 17/577,250, filed on on Jan. 17, 2022 (SEA-008-US).

SEA-008-U.S. Ser. No. 17/577,250 is a continuation-in-part of U.S. patent application Ser. No. 16/276,053, filed on Feb. 14, 2019, which is now U.S. Pat. No. 11,226,410, issued on Jan. 18, 2022 (SEA-001-US).

SEA-001-U.S. Pat. No. 11,226,410 claims benefit from U.S. provisional application, Ser. No. 62/630,362 filed on Feb. 14, 2018 (SEA-001-US-prov).

The entire contents of these patent applications and patents are incorporated herein by reference.

FIELD OF THE INVENTION

The present invention relates to the aviation industry, and in particular to the method and system for determining a spatial position/location of an aircraft or another flying object such as drone equipped to receive signals from a Secondary Surveillance Radar (SSR).

BACKGROUND OF THE INVENTION

It is important to know a spatial position of an aircraft in the air, which nowadays is usually determined by a Global Positioning System (GPS). However, it is not uncommon that GPS may experience jamming or malfunctioning.

Therefore there is a need in the industry for developing an alternative method and system for determining a spatial position of an aircraft, which would be independent of GPS measurements.

SUMMARY OF THE INVENTION

There is an object of the invention to provide a method and system for determining a spatial position of an airborne vehicle using one or more SSR as beacons.

According to one aspect of the present invention, there is provided a method for determining a position of an airborne vehicle equipped to receive signals from at least one secondary surveillance radar (SSR), the method comprising:
(a) determining a first pulse repetition frequency (PRF) pattern for staggered interrogation pulses (P1, P2, P3) of a first SSR, including determining an interrogation mode of the first SSR and duration of the first PRF pattern;
(b) determining a first distance from the first SSR to the airborne vehicle, comprising:
  (i) at the airborne vehicle, at a first reception time instant, receiving an interrogation signal, comprising at least one of P1, P2 or P3 pulses, from the first SSR;
  (ii) estimating a first transmit time instant of said at least one of P1, P2 or P3 pulses, based on the first reception time instant and the first PRF pattern, thereby determining the first distance;
(c) determining other measurements required for determining the position;
(d) determining the position using said first distance and said other measurements.

In the method described above, the step (a) further comprises:
during a time-window where the airborne vehicle is within a range of an antenna of the first SSR:
  detecting one of: successive P1 or P3 pulses, or successive P2 pulses; forming a time-ordered sequence of intervals separating the successive P1 or P3 pulses, or the successive P2 pulses;
  identifying at least two successive congruent segments of the time-ordered sequence; determining a pulse repetition pattern of P1 or P3 pulses, or P2 pulses as one of the segments subject to the constraint that a number of intervals of said one of the segments is within an initial length lower bound and a predefined length upper bound;
  deriving the first PRF pattern based on the pulse repetition pattern of P1 or P3 pulses, or P2 pulses and taking into account the interrogation mode of the first SSR.

In the method described above, the step (ii) of estimating the first transmit time instant further comprises:
prior to navigation-instrument failure:
at a reference reception time instant of receiving a reference interrogation signal from the first SSR at the airborne vehicle, recording a position of the airborne vehicle from the navigation-instrument and a position of the first SSR, thereby determining a distance between the SSR and the airborne vehicle, and calculating a reference time instant when the reference interrogation signal has been sent by the first SSR;
upon the navigation-instrument failure:
at consecutive time instances, receiving consecutive interrogation signals from the first SSR at the airborne vehicle when the airborne vehicle is within a main lobe of the first SSR;
determining an integer number of first PRF patterns fitting into respective time intervals between said consecutive time instances and the reference time instant, comprising determining respective remaining time intervals which are shorter than the duration of the first PRF, the remaining respective time intervals defining a fractional section of the first PRF pattern, including matching the fractional section of the first PRF pattern with the first PRF pattern;
determining the first transmit time instant based on the integer number of first PRF patterns and said matched fractional section of the first PRF pattern.

In the method described above, the navigation-instrument comprises a Global Positioning System (GPS).

In the method described above, the step (c) further comprises determining said other measurements as one or more of the following:
determining an angular displacement of the airborne vehicle with regard to the first SSR since a last known position of the airborne vehicle obtained prior to navigation-instruments failure and taking into account a rotational speed of said first SSR;
determining an altitude of the airborne vehicle.

In the method described above, wherein the step (c) further comprises:

determining a second pulse repetition frequency (PRF) pattern for staggered interrogation pulses (P1, P2, P3) of a second SSR, including determining an interrogation mode of the second SSR;

determining a second distance from the second SSR to the airborne vehicle, comprising:

at the airborne vehicle, at a second reception time instant, receiving an interrogation signal, comprising at least one of P1, P2 or P3 pulses, from the second SSR;

estimating a second transmit time instant of said at least one of P1, P2 or P3 pulses based on the second reception time instant and the second PRF pattern, thereby determining the second distance;

determining a speed and direction of flight of the airborne vehicle between the first reception time instant and the second reception time instant; and determining the position of the ownship using the first distance, the second distance, the speed and the direction.

In the method described above, wherein the step (c) further comprises:

determining a second pulse repetition frequency (PRF) pattern for staggered interrogation pulses (P1, P2, P3) of a second SSR, including determining an interrogation mode of the second SSR;

determining a second distance from the second SSR to the airborne vehicle, comprising:

at the airborne vehicle, at a second reception time instant, receiving an interrogation signal, comprising at least one of P1, P2 or P3 pulses, from the second SSR;

estimating a second transmit time instant of said at least one of P1, P2 or P3 pulses based on the second reception time instant and the second PRF pattern, thereby determining the second distance;

determining a third pulse repetition frequency (PRF) pattern for staggered interrogation pulses (P1, P2, P3) of a third SSR, including determining an interrogation mode of the third SSR;

determining a third distance from the third SSR to the airborne vehicle, comprising:

at the airborne vehicle, at a third reception time instant, receiving an interrogation signal, comprising at least one of P1, P2 or P3 pulses, from the third SSR;

estimating a third transmit time instant of said at least one P1, P2 or P3 pulses based on the third reception time instant and the third PRF pattern, thereby determining the third distance; and determining the position of the airborne vehicle using the first position, the second position, and the third position.

In the method described above, the step (a) comprises determining the first PRF pattern based on: P1 pulses; P2 pulses; both P1 pulses and P2 pulses.

In the method described above, the determining the position of the airborne vehicle comprises determining a position one of the following: a manned aircraft; an unmanned aircraft.

According to another aspect of the invention, there is provided a system for determining a spatial position of an airborne vehicle equipped to receive signals from one or more Secondary Surveillance Radar (SSR), the module comprising:

a processor;

a memory having computer executable instructions stored thereon for execution by the processor, causing the processor to:

(a) determine respective pulse repetition frequency (PRF) patterns for staggered interrogation pulses (P1, P2, P3) said one or more SSRs, including determining corresponding interrogation modes of said one or more SSRs;

(b) determine respective distances from said one or more SSR to the airborne vehicle, comprising:

(i) at the airborne vehicle, at respective reception time instances, receive respective interrogation signals, comprising corresponding at least one of P1, P2 or P3 pulses, from said one or more SSR;

(ii) estimate respective transmit time instances of said corresponding at least one of P1, P2 or P3 pulses based on said respective reception time instances and said respective PRF patterns, thereby determining said respective distance;

(c) determine other measurements required for determining the position; and (d) determine the position using said respective distance and said other measurements.

In the system described above, the computer executable instructions causing to estimate said respective transmit time instances further cause the processor to:

for each said respective transmit time instance:

prior to navigation-instrument failure:

at a reference reception time instant of receiving a reference interrogation signal from the first SSR at the airborne vehicle, record a position of the airborne vehicle from the navigation-instrument and a position of the first SSR, thereby determining a distance between the SSR and the airborne vehicle, and calculate a reference time instant when the reference interrogation signal has been sent by the first SSR;

upon the navigation-instrument failure:

at consecutive time instances, receive consecutive interrogation signals from the first SSR at the airborne vehicle when the airborne vehicle is within a main lobe of the first SSR;

determine an integer number of first PRF patterns fitting into respective time intervals between said consecutive time instances and the reference time instant, comprising determining respective remaining time intervals which are shorter than the duration of the first PRF, the remaining respective time intervals defining a fractional section of the first PRF pattern, including matching the fractional section of the first PRF pattern with the first PRF pattern;

determine the first transmit time instant based on the integer number of first PRF patterns and said matched fractional section of the first PRF pattern.

In the system described above, the one or more Secondary Surveillance Radar (SSR) comprise one of the following: one SSR; two SSR; three SSR.

In the system described above, the computer executable instructions to determine said respective PRF patterns further cause the processor to:

during a time-window where the airborne vehicle is within a range of a respective antenna of said respective one or more SSR:

detect one of: successive P1 or P3 pulses or successive P2 pulses;

form a time-ordered sequence of intervals separating the successive P1 or P3 pulses, or successive P2 pulses;

identify at least two successive congruent segments of the time-ordered sequence;
determine a pulse repetition pattern of P1 or P3 pulses, or P2 pulses as one of the segments subject to the constraint that a number of intervals of said one of the segments is within an initial length lower bound and a predefined length upper bound;
derive said respective PRF patterns based on respective pulse repetition patterns of P1 or P3 pulses, or P2 pulses and respective interrogation modes of said one or more SSR.

In the system described above, the computer executable instructions cause the processor to to determine said respective PRF patterns based on: P1 pulses; P2 pulses; both P1 pulses and P2 pulses.

In the system described above, the airborne vehicle is one of the following: a manned aircraft; an unmanned aircraft.

According to yet another aspect of the invention, there is provided a module for determining a spatial position of an airborne vehicle equipped to receive signals from one or more Secondary Surveillance Radar (SSR), the module comprising:
a memory having computer executable instructions stored thereon for execution by a processor, causing the processor to:
(a) determine respective pulse repetition frequency (PRF) patterns for staggered interrogation pulses (P1, P2, P3) said one or more SSRs, including determining corresponding interrogation modes of said one or more SSRs;
(b) determine respective distances from said one or more SSR to the airborne vehicle, comprising:
(i) at the airborne vehicle, at respective reception time instances, receive respective interrogation signals, comprising corresponding at least one of P1, P2 or P3 pulses, from said one or more SSR;
(ii) estimate respective transmit time instances of said corresponding at least one of P1, P2 or P3 pulses based on said respective reception time instances and said respective PRF patterns, thereby determining said respective distance;
(c) determine other measurements required for determining the position; and
(d) determine the position using said respective distance and said other measurements.

In the module described above, the computer executable instructions causing to estimate said respective transmit time instances further cause the processor to:
for each said respective transmit time instance:
prior to navigation-instrument failure:
at a reference reception time instant of receiving a reference interrogation signal from the first SSR at the airborne vehicle, record a position of the airborne vehicle from the navigation-instrument and a position of the first SSR, thereby determining a distance between the SSR and the airborne vehicle, and calculate a reference time instant when the reference interrogation signal has been sent by the first SSR;
upon the navigation-instrument failure:
at consecutive time instances, receive consecutive interrogation signals from the first SSR at the airborne vehicle when the airborne vehicle is within a main lobe of the first SSR;
determine an integer number of first PRF patterns fitting into respective time intervals between said consecutive time instances and the reference time instant, comprising determining respective remaining time intervals which are shorter than the duration of the first PRF, the remaining respective time intervals defining a fractional section of the first PRF pattern, including matching the fractional section of the first PRF pattern with the first PRF pattern;
determine the first transmit time instant based on the integer number of first PRF patterns and said matched fractional section of the first PRF pattern.

In the module described above, said one or more Secondary Surveillance Radar (SSR) comprise one of the following: one SSR; two SSR; three SSR.

In the module described above, the computer executable instructions to determine said respective PRF patterns further cause the processor to:
during a time-window where the airborne vehicle is within a range of a respective antenna of said respective one or more SSR:
detect one of: successive P1 or P3 pulses, or successive P2 pulses; form a time-ordered sequence of intervals separating the successive P1 or P3 pulses, or successive P2 pulses;
identify at least two successive congruent segments of the time-ordered sequence; determine a pulse repetition pattern of P1 or P3 pulses, or P2 pulses as one of the segments subject to the constraint that a number of intervals of said one of the segments is within an initial length lower bound and a predefined length upper bound;
derive said respective PRF patterns based on respective pulse repetition patterns of P1 or P3 pulses, or P2 pulses and respective interrogation modes of said one or more SSR.

In the module described above, the computer executable instructions cause the processor to to determine said respective PRF patterns based on: P1 pulses; P2 pulses; both P1 pulses and P2 pulses.

In the module described above, the airborne vehicle is one of the following: a manned aircraft; an unmanned aircraft.

Thus, an improved method, system and module for determining the position of the airborne vehicle using one or more SSR as beacons have been provided.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

DESCRIPTION OF THE EMBODIMENTS

Figure 1:
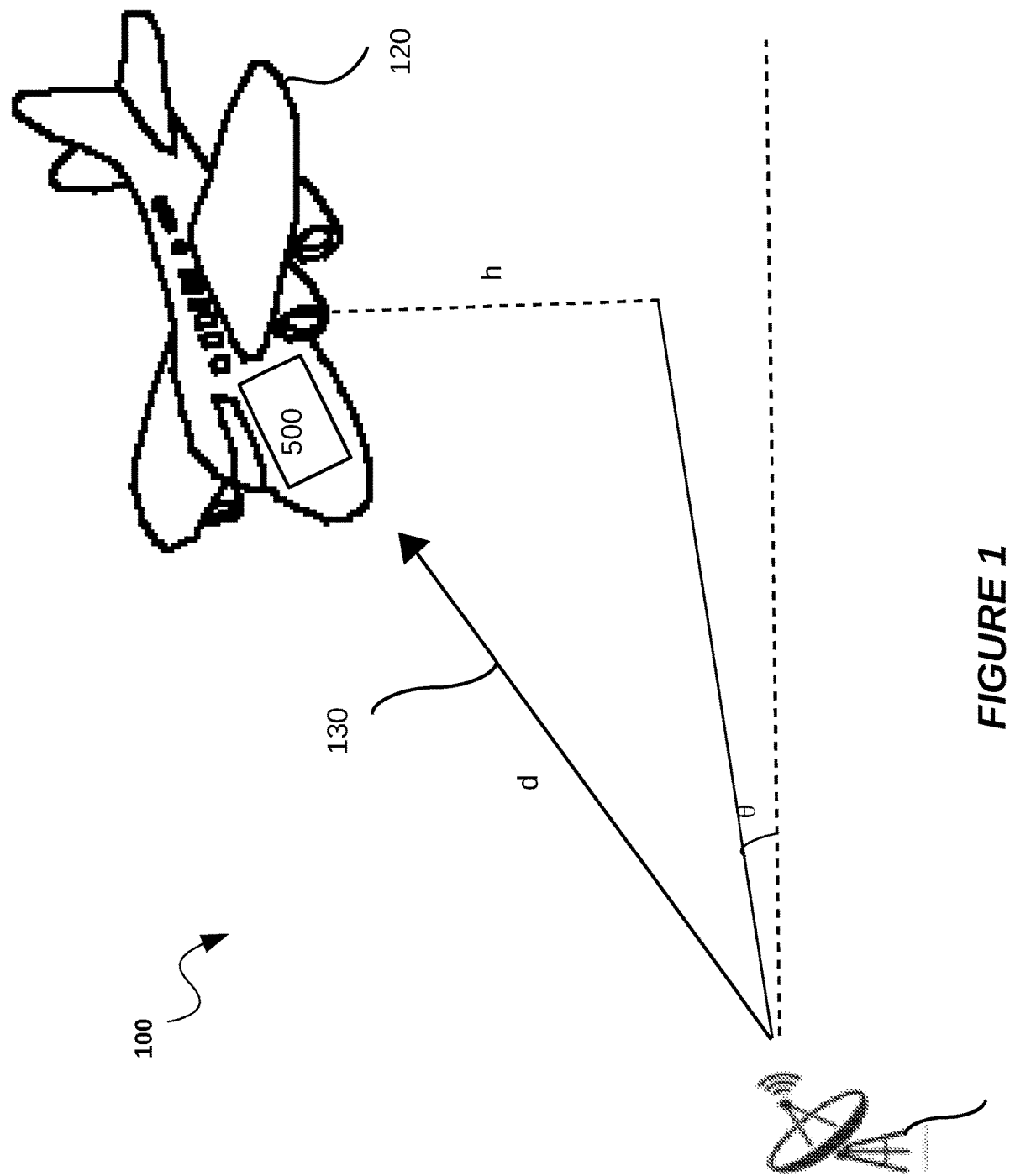
FIG. 1 illustrates an arrangement for determining a spatial position of the ownship using a single SSR according to an embodiment of the invention.

FIG. 1 illustrates a basis arrangement 100 comprising a Secondary Surveillance Radar (SSR) 110 on the ground, communicating with an airborne aircraft 120 along a communication path 130.

The aircraft 120 comprises a system 500 for determining a spatial position, or location, of the aircraft, the system 500 comprising a hardware processor and a computer memory storing computer executable instructions for execution by the processor, as will be described in more detail below.

The aircraft 120 may be a piloted aircraft or manned aircraft, a remotely piloted aircraft "drone" or unmanned aircraft, or any other flying object, which is equipped with the system 500. To differentiate our flying object from other aircraft of third parties, our flying object will be referred to as "ownship" 120 or airborne vehicle 120 in this patent application.

Various arrangements can be made for determining the spatial position of the ownship 120, involving a single SSR 110, and multiple SSRs.

Embodiments involving a single SSR To determine a 3-dimensional position of an object in space, such as aircraft, three coordinates need to be determined, for example:

(1) a distance "d" between the SSR 110 and the ownship 120;

(2) an altitude "h" of the ownship 120; and (3) and angle/azimuth 6 of the ownship 120 with regard to the SSR 110.

The distance "d" between the SSR 110 and the ownship 120 can be determined as follows.

(A1) In one embodiment, we can estimate the distance "d" between the SSR 110 and the ownship 120 by knowing the peaking power of the SSR 110.

Figure 2:
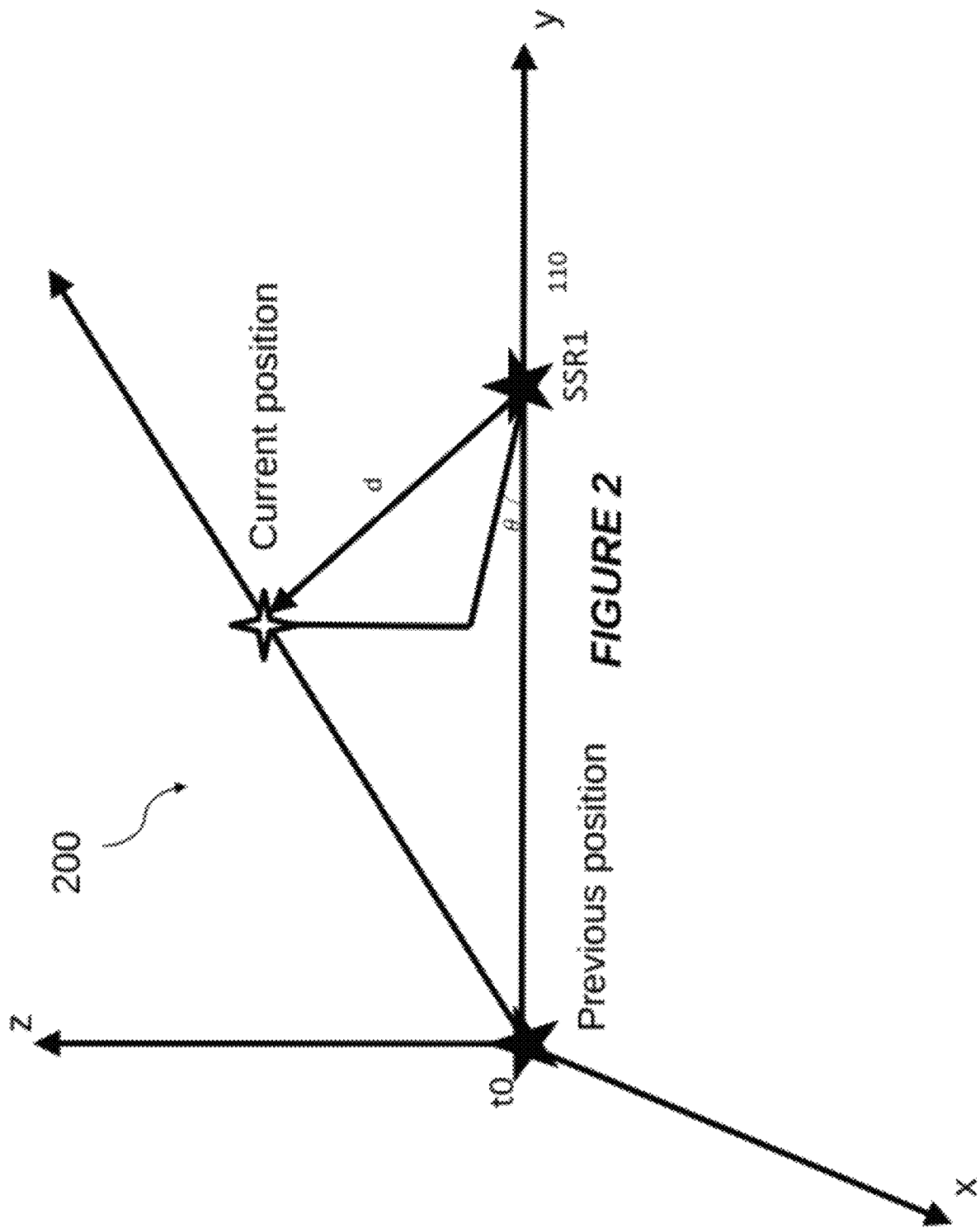
FIG. 2 illustrates the arrangement of FIG. 1 in more detail, showing the previous and current position of the ownship.

FIG. 2 illustrates an arrangement 200 with a single SSR 110 similar to that of FIG. 1, showing a previous spatial position of the ownship 120, and a current spatial position of the ownship 120.

According to the Frii's equation in the free space $$P_r = P_t \times G_t \times G_r \times \left(\frac{\lambda}{4\pi d}\right)^2$$

where $P_r$ and $P_t$ are the receive and transmit power respectively, $G_t$ and $G_r$ are the antenna gains at transmit and receive sides respectively, and "d" is the distance. Here, we can clearly see that the receiving power is inversely proportional to $d^2$, and this exponent will be definitely larger in real world, normally around 3.8 in wireless communications. Therefore, we can estimate the distance "d" based on transmit and receive power levels by using Frii's equation.

(A2) Alternatively, in another embodiment using a single SSR 110, the distance "d" between the SSR 110 and the ownship 120 can be measured more accurately than in the above noted embodiment A1, based on the Pulse Repetition Frequency (PRF) derived from the statistical processing of staggered P1 or P2 pulses, together with the known position of the ownship 120 and SSR 110 before losing a GPS signal, which is used to calculate and predict the transmission time of the interrogation signal in the future. This is called profiling the SSR. Therefore, when the ownship 120 receives a particular interrogation signal with known transmission time from the SSR profiling step (the receive time is of course known when the ownship 120 receives a signal from the SSR), the distance between the ownship 120 and the SSR 110 can be calculated.

Methods for determining the PRF pattern have been described in detail in the previous U.S. Pat. No. 11,226,410 issued Jan. 18, 2022, and U.S. patent application Ser. No. 17/577,250 filed Jan. 17, 2022, of the same assignee.

The altitude "h" is measured by altimeter, which is a standard equipment in all aircraft.

The azimuth θ of the ownship 120 with respect to the SSR 110 can be determined as follows. Based on the property of the SSR 110, we know the rotational speed of the SSR 100 as ω. Suppose there is any previous position of the ownship 120 before the GPS at the ownship 120 gets jammed or say before it is lost, denoted as $t_0$, then we know the position of the ownship 120 at $t_0$, the position of the SSR 110, and we know the SSR 110 was pointing at the ownship 120. Therefore, we have the starting line of the angle θ. After a period of time, suppose the ownship has moved at the point in the FIG. 2, called current position 120, and we know the time difference ←t according to the clock equipped on the ownship 120, thus having the ending line of the angle θ. To this end, we can know the angle θ=ω·Δt, where ω is the angler speed of the SSR.

The values of the measurements for the distance "d", altitude "h" and azimuth θ are supplied to the system 500 onboard of the ownship 120, for determining a 3D position of the ownship 120.

Figure 8:
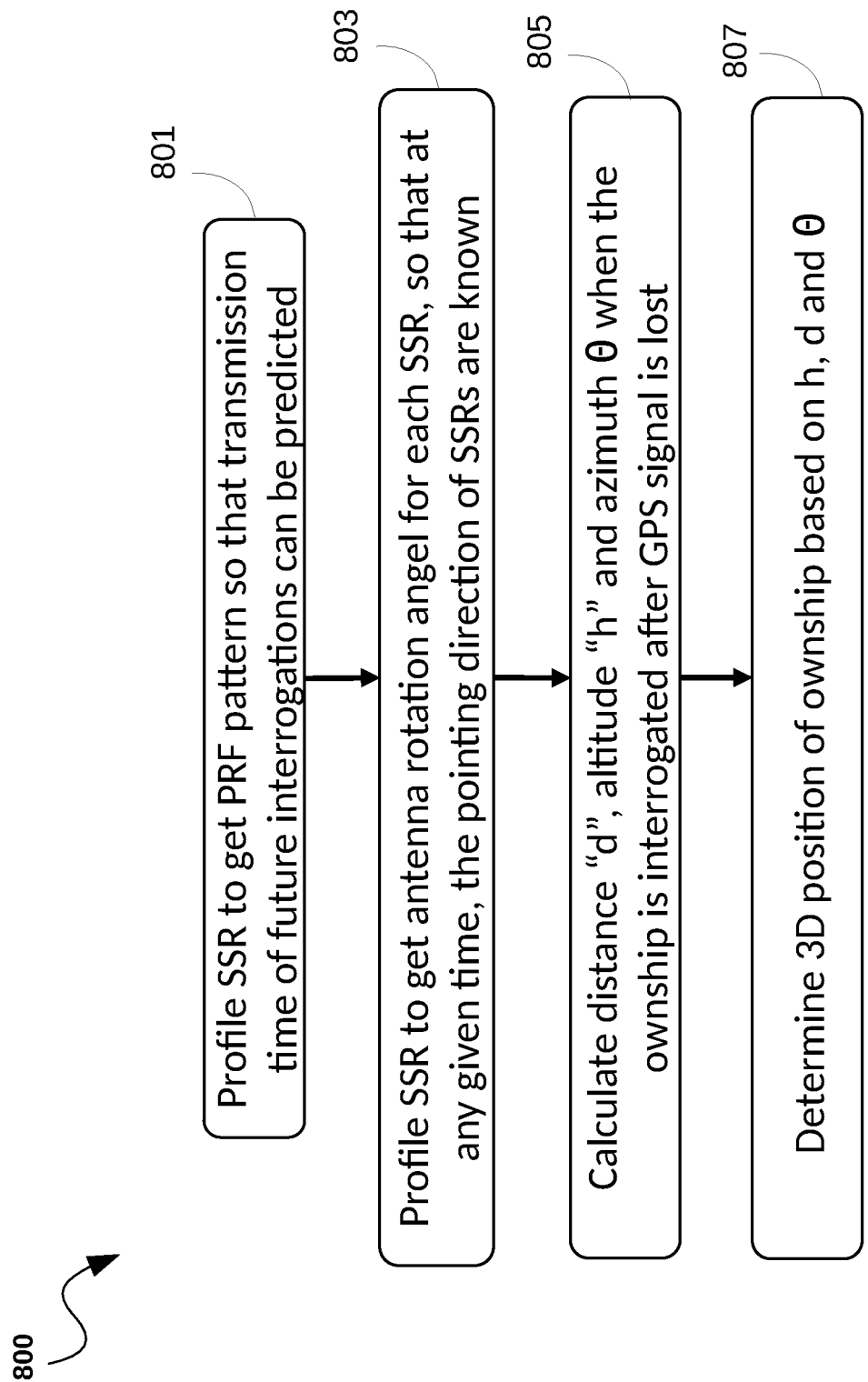
FIG. 8 illustrates an operational flow chart for embodiments of the present invention involving a single SSR.

The above process is shown in FIG. 8, illustrating an operational flow chart 800 for embodiments of the present invention involving a single SSR. The step 801 is to profile the SSR to get a PRF pattern, so that transmission time of future interrogations can be predicted. Step 803 is to profile the SSR to get an antenna rotation angle for each SSR, so that at any given time, the pointing direction of the SSRs are known. Finally, the step 805 is to calculate the distance "d", altitude "h" and azimuth Θ, when the ownship is interrogated after GPS signal is lost.

Determination of the Transmission Time

Step 1: At a reference point, the ownship 120 already knows the pulse repetition frequency PRF pattern, its own position, and the position of the secondary surveillance radar (SSR).

Step 2: The ownship calculates the distance between itself and the SSR based on their respective positions.

Step 3: Once the ownship 120 receives an interrogation signal at the time instance $r_0$, the ownship 120 calculates the corresponding transmission time $t_0$ of the interrogation from the SSR 110, because the ownship 120 knows the distance between itself and the SSR 110.

Figure 2A:
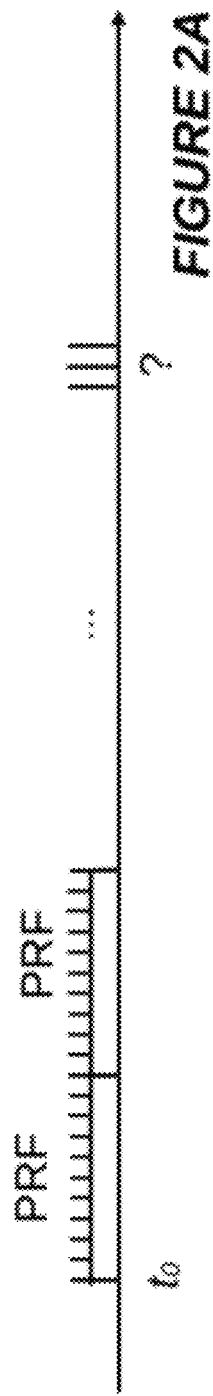
FIG. 2A illustrates setting a counter for counting a number of PRF patters for determining an estimate transmit time instant.

Step 4: At a first stage, the ownship sets up a counter for the future transmission time based on the reference transmission time $t_0$ at the reference point and the PRF, as schematically illustrated in FIG. 2A.

Step 5: At a second stage, a rough estimation of the transmission time of the interrogation is determined. The ownship 120 receives another interrogation signal at the time instance $r_i$ and needs to calculate the corresponding transmission time $t_i$. The ownship 120 calculates the integer number of PRF patters from $r_0$ to $r_i$ (equivalently from $t_0$ to $t_i$) by calculating $$N = \text{floor}\left(\frac{r_i - r_0}{PRF}\right).$$

Here floor (x) rounds each element of x to the nearest integer less than or equal to that element, i.e., floor(4.3)=floor(4.7) =4. The integer number of PRF patterns multiplied by a duration of a single PRF pattern provides a rough estimate for the time interval between $r_0$ and $r_i$, and hence a rough estimate for the transmission time. This is schematically illustrated in FIG. 2B.

Step 6: At a third stage, the transmission time is estimated accurately. The ownship will receive several consecutive interrogation signals, for example in one mainlobe of SSR antenna for example, for example the ownship receives three consecutive interrogations at the time instance $r_{i-1}$, $r_i$ and $r_{i+1}$. The measured fractional/partial section of the PRF pattern for $r_{i-1}$, $r_i$ and $r_{i+1}$ interrogations (or more interrogations) is compared with the already available entire PRF pattern calculated earlier, so that the recorded partial section of the PRF should match the corresponding transmission time pattern $t_{i-1}$, $t_i$ and $t_{+1}$, which is part of the entire PRF. It is understood that temporal intervals between consecutive interrogations at the SSR (at transmission) and corresponding temporal intervals of interrogations received at the ownship are the same, which allows to match the transmission and reception patterns. This is schematically illustrated in FIG. 2C.

The above method of determining the estimated transmit time will use at a minimum 2 consecutive interrogations, if all interrogations have different time spacing. In practice, the ownship 120 can receive 5 or more consecutive interrogations while the ownship is in the mainlobe of the SSR, depending on the distance of the ownship from the SSR. If the ownship 120 is in close proximity to the SSR 110, the P2 pulses from sidelobe and the backlobe of the SSR 110 may be used to match the PRF pattern. It is understood that both P1 and P3 pulses may be used to uniquely match the measured fractional section of the PRF pattern to the entire PRF.

Figure 2B:
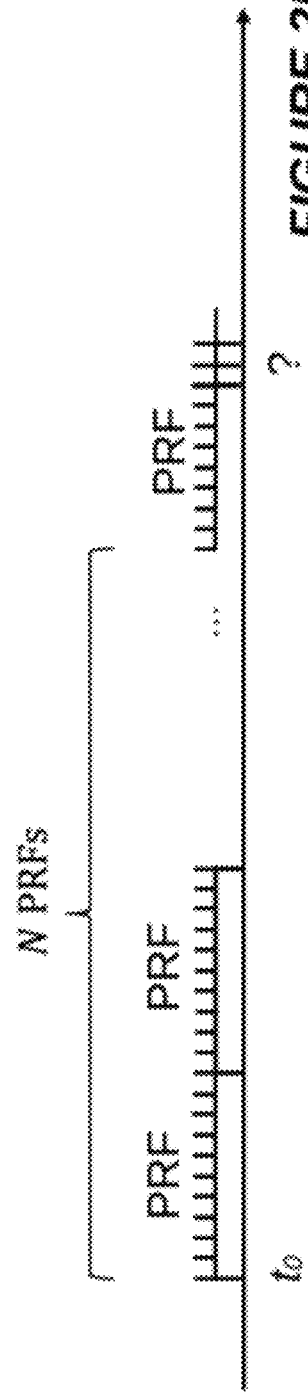
FIG. 2B illustrates a rough estimate of the transmit time instant of the interrogation from the SSR using a pulse repetition frequency (PRF) pattern for staggered interrogation pulses.
Figure 2C:
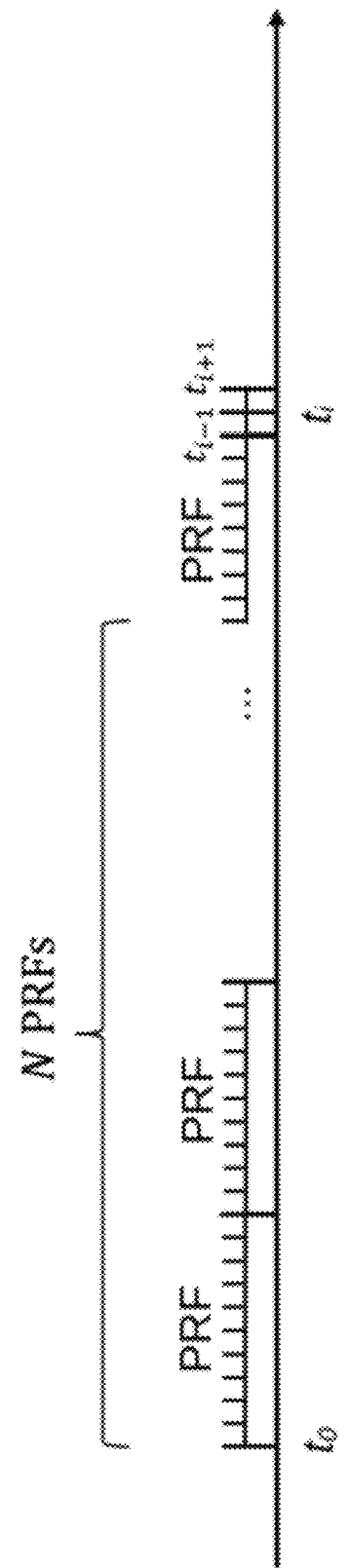
FIG. 2C illustrates an accurate determining of the transmit time instant.
Figure 2D:
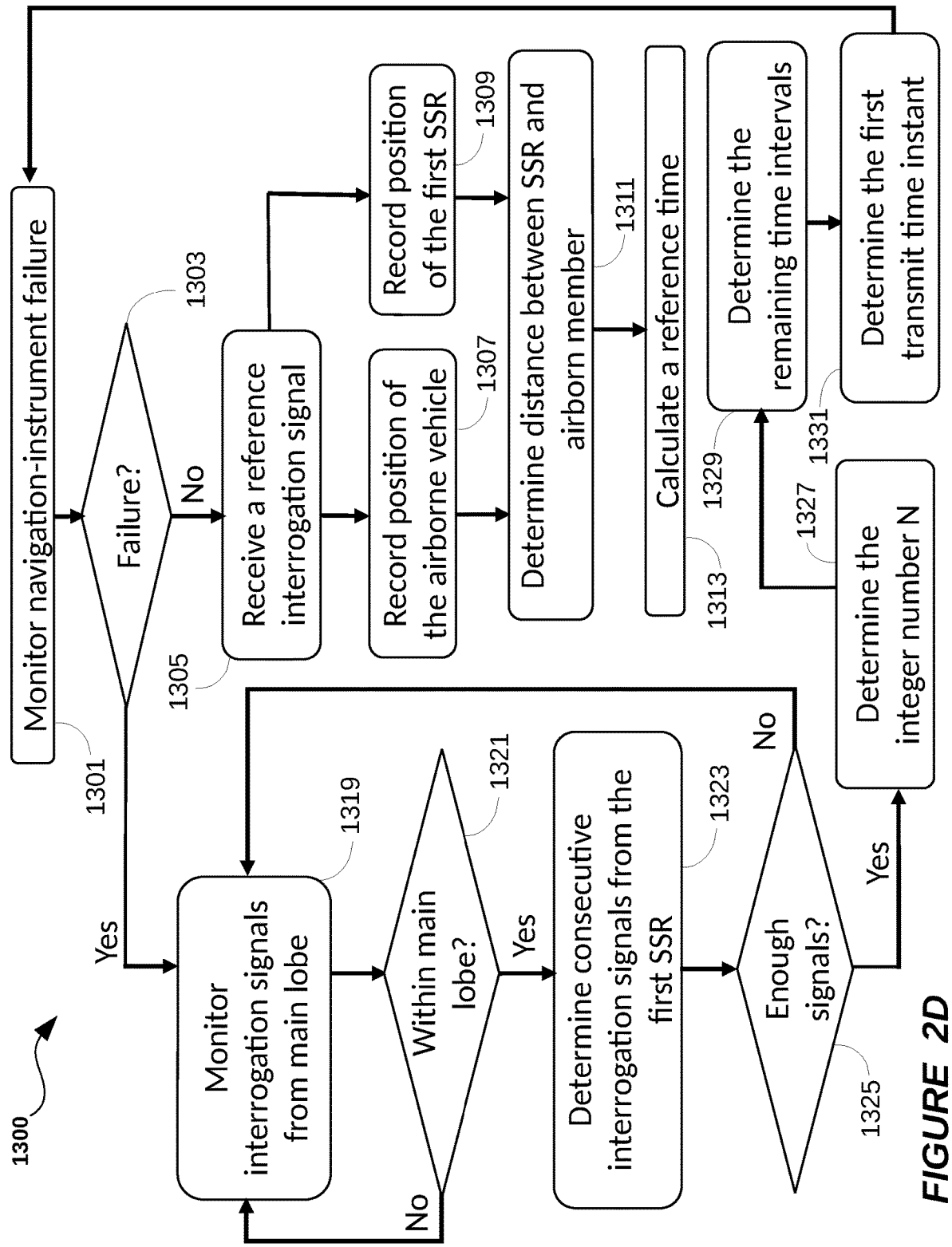
FIG. 2D illustrates an operational flow chart for the method of determining the estimate transmit time instant of FIGS. 2A to 2C.

FIG. 2D shows an operational flow chart for the method 1300 for determining an estimated transmit time instant of the interrogation from the SSR of FIGS. 2A-2C. The step 1301 is to monitor the navigation-instrument failure. The next step 1303 is to determine whether failure has occurred. If the decision is "no", then the algorithm goes to step 1305 which is to receive a reference interrogation signal, after which the algorithm does to steps 1307 which is to record position of the airborne vehicle, and the step 1309 which is to record the position of the first SSR. The next step is 1311 which is to determine the distance between the SSR and the airborne member. The final step 1313 is to calculate a reference time.

Embodiments Involving Two SSRs

Figure 3:
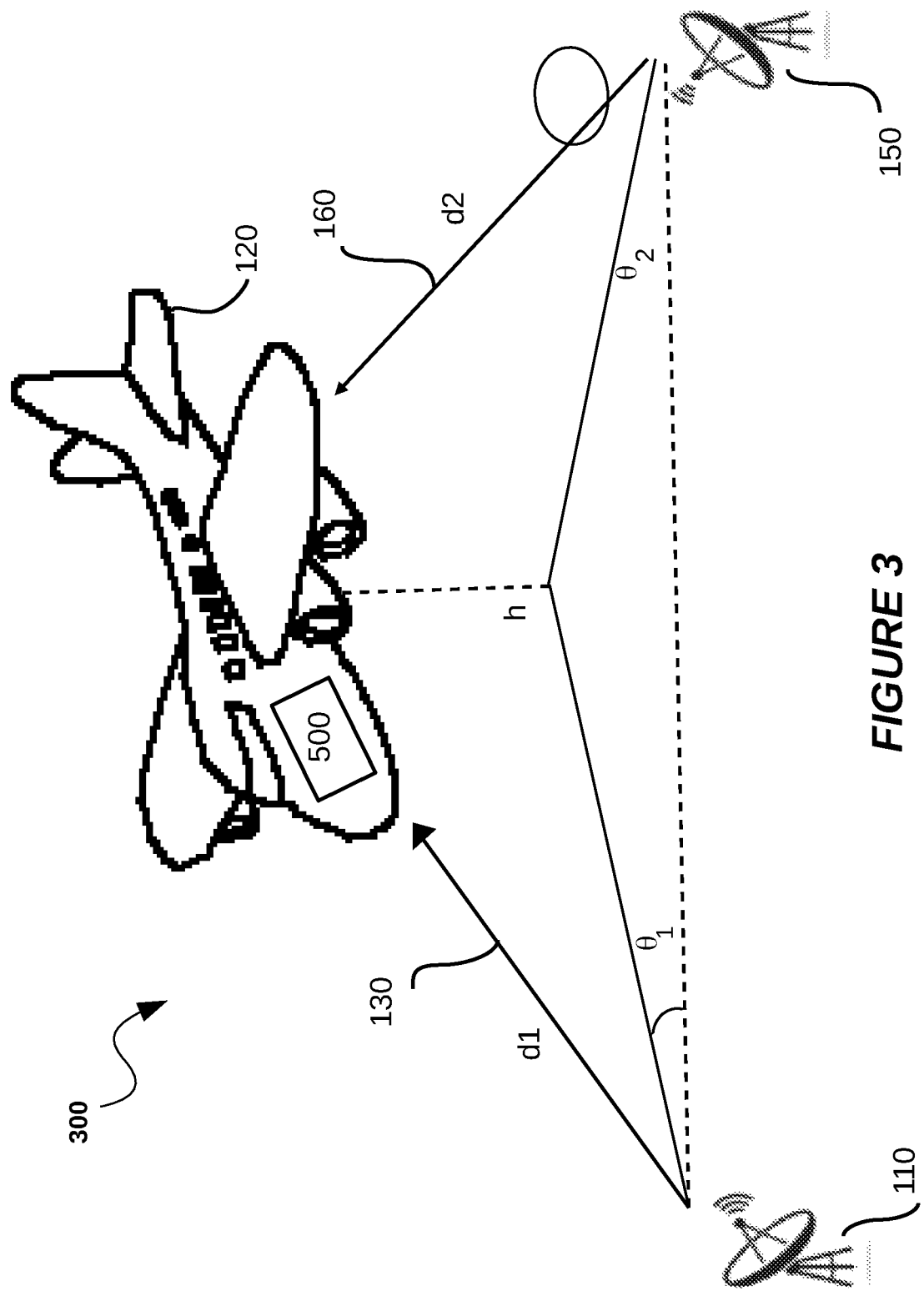
FIG. 3 illustrates an arrangement for determining a spatial position of the ownship using two SSRs according to another embodiment of the invention.

In a special case, the ownship is illuminated (interrogated) by the SSRs (here we consider two) at the same time. In this case, there are multiple ways to calculate the ownship position. FIG. 3 illustrates a basis arrangement 300 comprising a first SSR1 110 and a second SSR2 150 on the ground, communicating with an airborne aircraft 120 along a first communication path 130 and second communication path 160 respectively.

The following five measurements/variables can be measured in the arrangement 300, for example:

(1) A Distance1 "d1" from the SSR1 110 to the ownship 120 by using one of the methods of the embodiments (A1) or (A2) as described above;

(2) A Distance2 "d2" from the SSR2 150 to the ownship 120 by using one of the methods of the embodiments (A1) or (A2) as described above;

(3) Altitude of the ownship 120 as described above;

(4) an Angle1/azimuth1 $\theta_1$ of the ownship 120 with regard to the SSR1 110 as described above; and (5) an Angle2/azimuth2 $\theta_2$ of the ownship 120 with regard to the SSR2 150 as described above.

Various embodiments may be derived by selecting/measuring any three variables (out of 5 variables total indicated above) to determine a 3D position of the ownship 120, resulting in total 10 different combinations/embodiments: $C^5_3 = 5!/(3!2!)=10$ combinations (10 embodiments), namely:

Embodiment B1 (Distance1, Distance2, Altitude)
Embodiment B2 (Distance1, Distance2, Angle1)
Embodiment B3 (Distance1, Distance2, Angle2)
Embodiment B4 (Distance1, Altitude, Angle1)
Embodiment B5 (Distance1, Altitude, Angle2)
Embodiment B6 (Distance1, Angle1, Angle2)
Embodiment B7 (Distance2, Altitude, Angle1)
Embodiment B8 (Distance2, Altitude, Angle2)
Embodiment B9 (Distance2, Angle1, Angle2)

Measurements made by the first SSR1 110 and the second SSR2 150 may need to be synchronized in time between each other if variables needs to be measured at the same time instance, or alternatively the measurements need to be referenced/linked with regard to each other, using for example an additional information regarding the displacement and travel time of the ownship 120 or some other additional information.

Embodiment C1 (two SSR)

Figure 4:
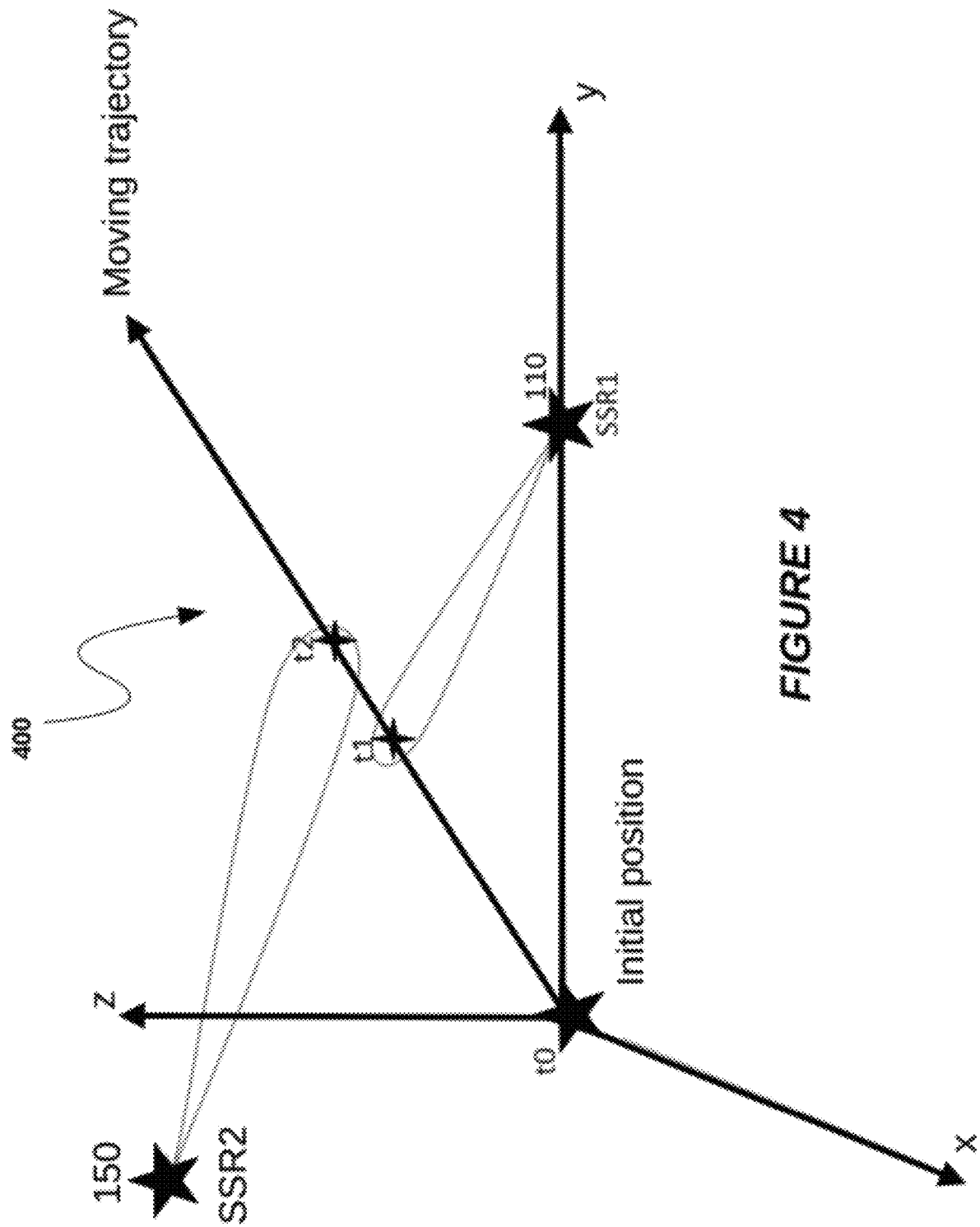
FIG. 4 illustrates another arrangement for determining a spatial position of the ownship using two SSRs according to yet another embodiment of the invention.

FIG. 4 illustrates an arrangement 400 involving the first SSR1 110 and the second SSR2 150, where the first SSR1 110 and the second SSR2 150 interrogate the ownship 120 at different time instances. FIG. 4 also shows an initial spatial position of the ownship 120 and a two further spatial positions of the ownship 120, at time instances $t_1$ and $t_2$. The trajectory of the ownship 120 is shown as a straight for the purpose of illustration only. The method described in this invention works for any trajectory.

In FIG. 4 the initial position and the interrogation transmit time is known at time $t_0$. The reference coordinates are set up as shown in FIG. 4. Assume the velocity vector of the ownship 120 is known as $(v_x, v_y, v_z)$ at some certain level of error constraint by using the inertial measurement unit (IMU) onboard the ownship, and we are able to measure a respective altitude "h" of the ownship 120 at an arbitrary time instant, for example h1 at the time instant $t_1$, and h2 at the time instant $t_2$. Here only the first two velocity component $v_x, v_y$ is involved in the following calculation.

A model shown in FIG. 4 will be processed at the system 500 for determining the spatial position of the ownship as shown in FIG. 3, where the initial position of the ownship 120 is the origin (0,0,0), SSR1 110 is positioned along the y-axis $(0, Y_{s1}, 0)$, and position of SSR2 150 is arbitrary as $(X_{s2}, Y_{s2}, Z_{s2})$, and the ownship 120 is moving linearly along the moving trajectory shown with velocity vector $v_x, v_y, v_z$ Suppose that SSR1 110 and SSR2 150 are not pointing at the ownship 120 at the same time. For example, SSR1 110 points to the ownship at time instant $t_1$, the receiving time is $t_{r_1}$, and the corresponding position of the ownship 120 at the time instant $t_1$ is (x1,y1,h1), where h1 can be measured.

The ownship 120 keeps moving until reaching the interrogation from SSR2 150 at time instant $t_2$, the receiving time is $t_{r_2}$, and the corresponding position of the ownship 120 at the time instant $t_2$ is (x2,y2,h2).

The time difference between these two receptions is defined as $\Delta t = t_{r_2} - t_{r_1}$, and thus $x2 = x1 + v_x \cdot \Delta t, y2 = y1 + v_y \cdot \Delta t$.

As a result, we have $$d1 = \sqrt{x1^2 + (y1 - Y_{s1})^2 + h1^2}$$
$$d2 = \sqrt{(x1 + v_x \cdot \Delta t - X_{s2})^2 + (y1 + v_y \cdot \Delta t - Y_{s2})^2 + (h2 - Z_{s2})^2}$$

where x1 and y1 are unknowns, h1 and h2 are measured, $[v_x, v_y]$ is also known, and d1 and d2 can be calculated by profiling the first SSR 110 and the second SSR 150:

$$\begin{cases} d1 = c \cdot (t_{r_1} - t_{t_1}) \\ d2 = c \cdot (t_{r_2} - t_{t_2}) \end{cases}$$

where $t_{t_1}, t_{t_2}$ are the transmitting time of interrogations from the first SSR1 110 and second SSR2 150, respectively.

This is a two-equations with two-variables quadratic equation which can be solved directly. By solving the equations, we can get the root x1, y1, and further obtain x2, y2, thus determining the respective position of the ownship at time instances $t_1$ and $t_2$. There could be two possible roots when solving quadratic equation and the reasonable one can be select by other known method such as angle of arrival measurement.

Embodiment C2 (two SSR)

Below is a description of another variation of the embodiment C1 described above, to be referred to as embodiment C2. This method yields the same results as in Embodiment C1 by solving the same quadratic equation group using Newton's method other than solving the equation directly. The reason we introduce it here is to prepare for the more-than-two SSRs case introduced below. In the embodiment C2, for the convenience of easier migration of the method to more-than-two SSRs cases, we make an assumption that the SSR1 position is at $(X_{s1}, Y_{s1}, Z_{s1})$, resulting in the following equations:

$$d1 = \sqrt{(x1 - X_{s1})^2 + (y1 - Y_{s1})^2 + (h1 - Z_{s1})^2} \quad (1)$$

$$d2 = \sqrt{(x1 + v_x \cdot \Delta t - X_{s2})^2 + (y1 + v_y \cdot \Delta t - Y_{s2})^2 + (h2 - Z_{s2})^2} \quad (2)$$

Also respective distances d1 and d2 are determined by profiling the first SSR 110 and the second SSR 150 similar to the above $$\begin{cases} d1 = c \cdot (t_{r_1} - t_{t_1}) \\ d2 = c \cdot (t_{r_2} - t_{t_2}) \end{cases} \quad (3)$$

Through first Taylor expansion at $(x1_k, y1_k)$, where $(x1_k, y1_k)$ is the initial root used in a Newton's method. The initial value $(x1_k, y1_k)$ can be guessed by using the position before lost GPS signal and the IMU speed. For example, in FIG. 4, the initial guess for $(x1_k, y1_k)$ is $$\begin{cases} x1_k = t1 * v_x \\ y1_k = t1 * v_y \end{cases} \quad (4)$$

we can rewrite d1 as $$d1 \approx r_{1k} + \frac{x1_k - X_{s1}}{r_{1k}}(x1_{k+1} - x1_k) + \frac{y1_k - Y_{s1}}{r_{1k}}(y1_{k+1} - y1_k)$$

where $$r_{1k} = \sqrt{(x1_k - X_{s1})^2 + (y1_k - Y_{s1})^2 + (h1 - Z_{s1})^2}$$

d2 can be expressed in the similar way.

$$d2 \approx r_{2k} + \frac{x1_k + v_x \cdot \Delta t - X_{s2}}{r_{2k}}(x1_{k+1} - x1_k) + \frac{y1_k + v_y \cdot \Delta t - Y_{s2}}{r_{2k}}(y1_{k+1} - y1_k)$$

where $$r_{2k} = \sqrt{(x1_k + v_x \cdot \Delta t - X_{s2})^2 + (y1_k + v_y \cdot \Delta t - Y_{s2})^2 + (h2 - Z_{s2})^2}$$

Then we have $G \cdot \Delta = b$ where $$G = \begin{bmatrix} \frac{x1_k - X_{s1}}{r_{1k}} & \frac{y1_k - y_{s1}}{r_{1k}} \\ \frac{x1_k + v_x \cdot \Delta t - X_{s2}}{r_{2k}} & \frac{y1_k + v_y \cdot \Delta t - Y_{s2}}{r_{2k}} \end{bmatrix}$$

$$\Delta = \begin{bmatrix} x1_{k+1} - x1_k \\ y1_{k+1} - y1_k \end{bmatrix}$$

$$b = \begin{bmatrix} d1 - r_{1k} \\ d2 - r_{2k} \end{bmatrix}$$

We can use least square to calculate $$\Delta = G^1 b \quad (5)$$

And update the position via newton's method until the result converge (for example, both elements of $\Delta$ are all smaller than a certain number, say 1)

$$\begin{bmatrix} x1_{k+1} \\ y1_{k+1} \end{bmatrix} = \begin{bmatrix} x1_k \\ y1_k \end{bmatrix} + \Delta \quad (6)$$

Thus, the position of the ownship 120 x1, y1 at the time instance $t_1$ can been determined as the converged value $$\begin{bmatrix} x1_{k+1} \\ y1_{k+1} \end{bmatrix}.$$

Similar to the above, $x2=x1+v_x \cdot \Delta t$, $y2=y1+v_y \cdot \Delta t$, and thus the position of the ownship 120 x2, y2 at the time instance $t_2$ has been also determined. The above process is shown in FIG. 9.

Figure 9:
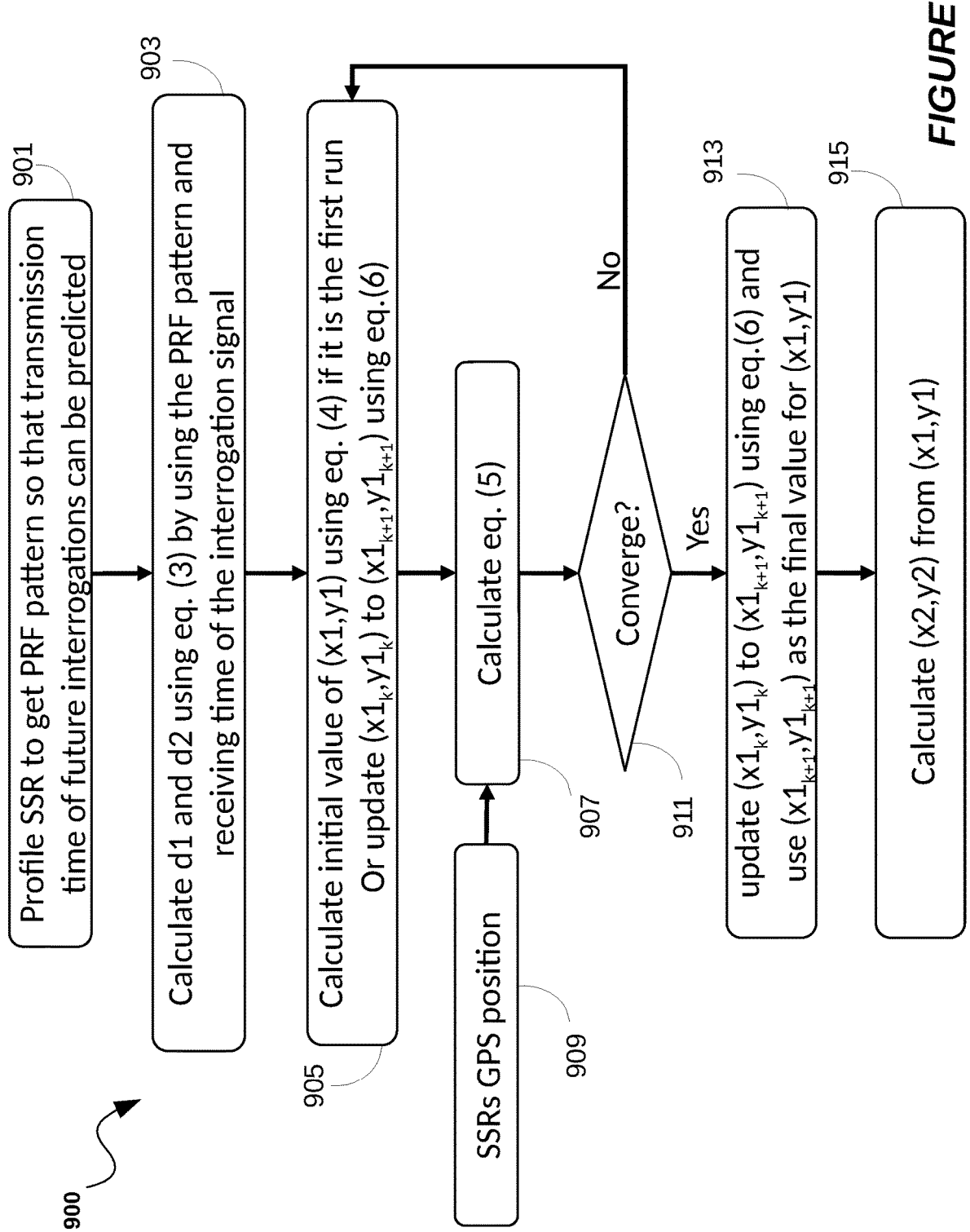
FIG. 9 illustrates an operational flow chart for an embodiment C2 of the invention involving two SSR.

FIG. 9 illustrates an operational flow chart 900 for an embodiment C2 of the invention involving two SSR. The step 901 is to profile SSR to get PRF pattern so that transmission time of future interrogations can be predicted. Step 903 is to calculate d1 and d2 using eq. (3) by using the PRF pattern and receiving time of the interrogation signal. Step 905 is to calculate initial value of (x1,y1) using eq. (4) if it is the first run or update $(x1_k, y1_k)$ to $(x1_{k+1}, y1_{k+1})$ using eq.(6), then step 907 is to calculate eq. (5), which is informed by the SSRs GPS position from step 909. The result from step 907 is then sent to step 911, where a decision is made whether to converge. If "no" is decided, then the algorithm returns to step 905. If "yes" is decided, then the algorithm proceeds to step 913, which is to update $(x1_k, y1_k)$ to $(x1_{k+1}, y1_{k+1})$ using eq.(6) and use $(x1_{k+1}, y1_{k+1})$ as the final value for (x1,y1). Finally the step 915 is to calculate (x2,y2) from (x1,y1).

Embodiments Involving Three SSRs

Figure 5:
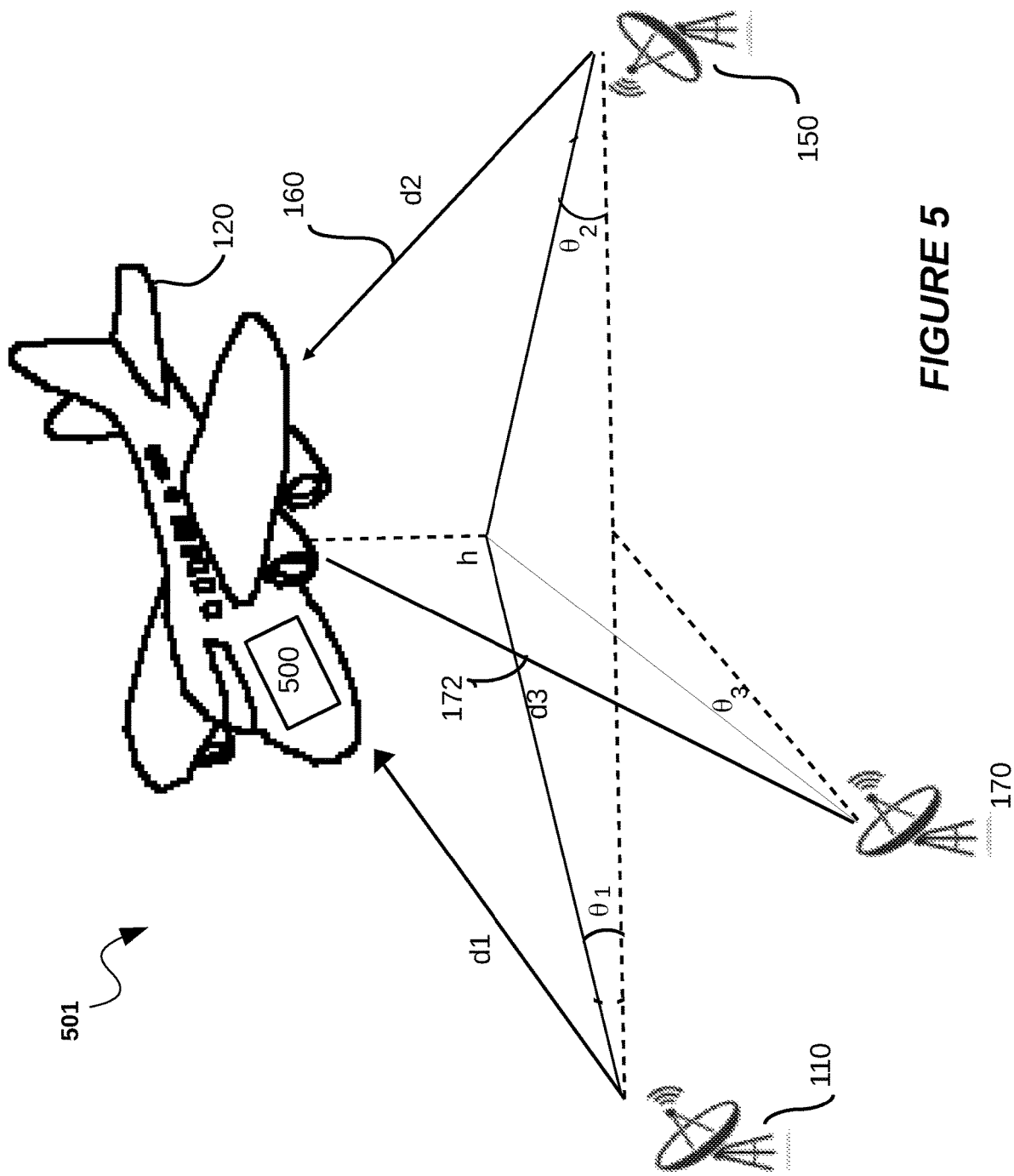
FIG. 5 illustrates an arrangement for determining a spatial position of the ownship using three SSRs according to one more embodiment of the invention.

In a very rare case, the ownship is illuminated (interrogated) by the SSRs (here we consider three) at the same time. In this case, there are multiple ways to calculate the ownship position. FIG. 5 illustrates a basis arrangement 501 comprising a first SSR1 110, a second SSR2 150 and a third SSR3 170 on the ground, respectively communicating with the ownship 120 along the first communication path 130, the second communication path 160, and a third communication path 172 respectively.

The following seven measurements/variables can be measured in the arrangement 500, for example:
(1) A Distance1 "d1" from the SSR1 110 to the ownship 120 by using one of the methods of the embodiments (A1) or (A2) as described above;
(2) A Distance2 "d2" from the SSR2 150 to the ownship 120 by using one of the methods of the embodiments (A1) or (A2) as described above;
(3) A Distance3 "d3" from the SSR3 170 to the ownship 120 by using one of the methods of the embodiments (A1) or (A2) as described above;
(4) Altitude of the ownship 120 as described above;
(5) an Angle1/azimuth1 $\theta_1$ of the ownship 120 with regard to the SSR1 110 as described above;
(6) an Angle2/azimuth2 $\theta_2$ of the ownship 120 with regard to the SSR2 150 as described above; and
(7) an Angle3/azimuth3 $\theta_3$ of the ownship 120 with regard to the SSR2 170 as described above.

Various embodiments may be derived by selecting/measuring any three variables (out of 7 variables total indicated above) to determine a 3D position of the ownship 120, resulting in total 35 different combinations/embodiments:

$C^7_3 = 7!/(3!2!) = 35$ combinations (35 embodiments).

By way of example, only a few selected embodiments out of total 35 embodiments are listed below:
Embodiment D1 (Distance1, Distance2, Distance3)
Embodiment D2 (Distance1, Distance2, Altitude)
Embodiment D3 (Distance1, Distance2, Angle1)
Embodiment D4 (Distance1, Distance2, Angle2)
Embodiment D4 (Distance1, Distance2, Angle3)
Embodiment D33 (Altitude, Angle1, Angle2)
Embodiment D34 (Altitude, Angle2, Angle3)
Embodiment D35 (Angle1, Angle2, Angle3)

Measurements made by the first SSR1 110, the second SSR2 150 and the third SSR 170 may need to be synchronized in time between each other if variables needs to be measured at the same time instance, or alternatively the measurements need to be referenced/linked with regard to each other, using for example an additional information regarding the displacement and travel time of the ownship 120 or some other additional information. In the embodiments described above, measurements based on timing, such as Distance1 and Distance2, are typically more accurate than measurements based on angles, such as Angle1 and Angle2, and therefore measurements based on timing/distances are usually preferred.

Modifications/Variations:

By using various embodiments from measurements obtained by two or more SSR as described above, it is possible to conduct multiple calculations of the spatial position of the ownship 120, independently of GPS measurements.

For example, in the embodiments B1 to B10 involving SSR1 110 and SSR2 150 are involved, it is possible to obtain 10 independent measurements of the position of the ownship 120, with various degree of error from each embodiment, and then calculate the average, or mean, or root mean square for the spatial position of the ownship 120, thus increasing the accuracy of measurements.

In the embodiments D1 to D35 described above involving SSR1 110, SSR2 150 and SSR3 170, a similar procedure of obtaining multiple measurements can be conducted, following by averaging or further processing of individual measurement results for more accurate calculation of the spatial position of the ownship 120.

Embodiment E Multiple SSRs)

Figure 6:
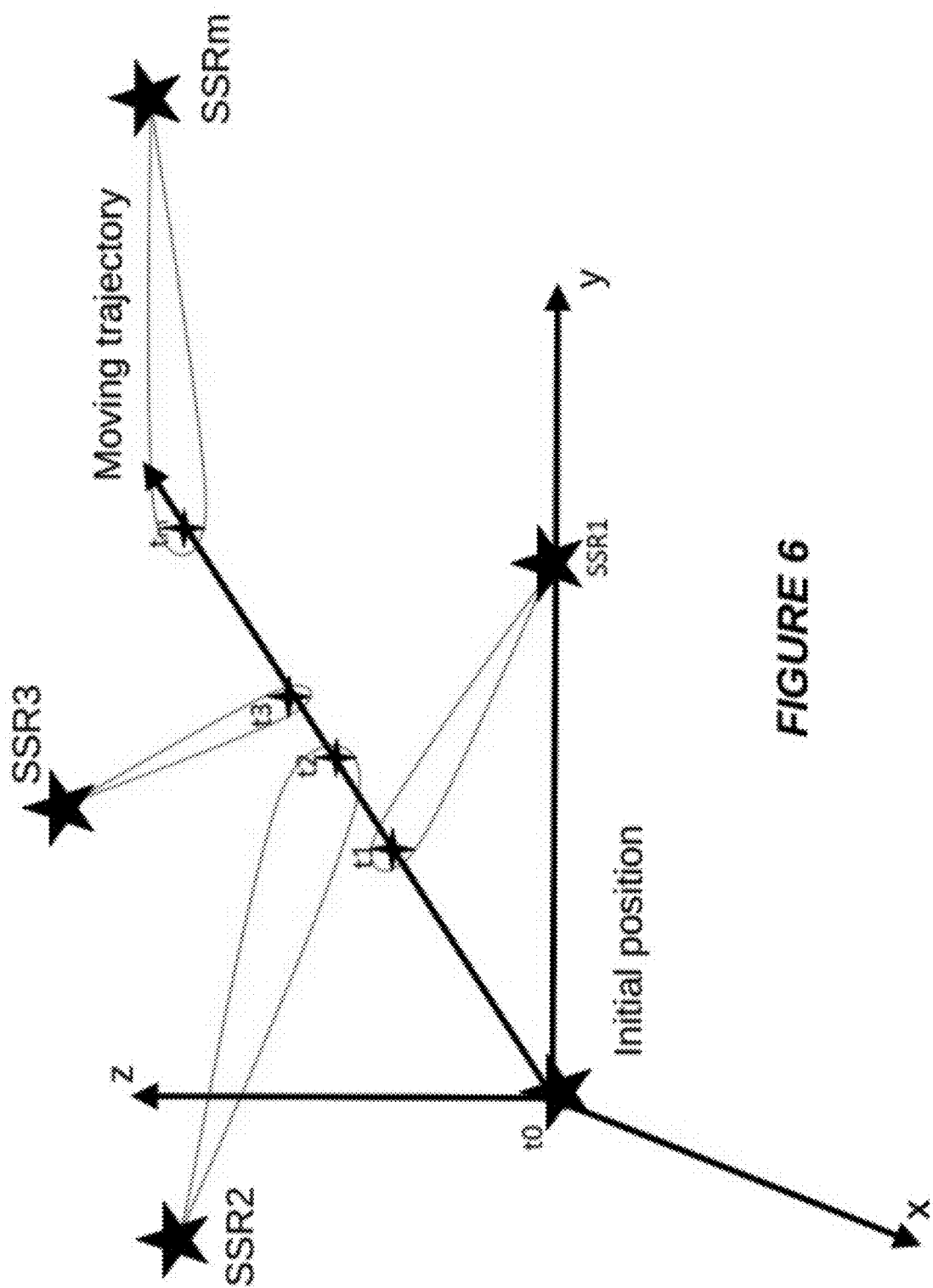
FIG. 6 illustrates an arrangement for determining a spatial position of the ownship using multiple SSRs according to yet one more embodiment of the invention.

This section is about using the method in Embodiment C2 for multiple (more than two) SSRs cases. FIG. 6 illustrates yet another embodiment for determining the spatial position of the ownship 120 using multiple SSRs.

In the embodiment E1, suppose we have up to M SSRs, and the ownship 120 sequentially receives respective interrogation from the corresponding SSR, which are well separated by profiling each SSR.

Let's assume, all interrogations are received at respective time instances $t_m \in [t_{r,1}, t_{r,M}]$ where $m \in [1,M]$, and the corresponding position of the ownship 120 at each time instant is defined as (xm, ym, hm).

To be consistent with the previous embodiments C1 and C2, the coordinate of each SSR is given as $(X_{sm}, Y_{sm}, Z_{sm})$, and the time of flight between any two adjacent time instances is defined as $\Delta t_m = t_{r,m} - t_{r,1}$, where the receiving time at the initial position is assumed as $t_{r,0} = 0$.

To this end, when we receive all interrogations from SSRs, we have $$d1 = \sqrt{(x1 - X_{s1})^2 + (y1 - Y_{s1})^2 + (h1 - Z_{s1})^2}$$
$$d2 = \sqrt{(x1 + v_x \cdot \Delta t_1 - X_{s2})^2 + (y1 + v_y \cdot \Delta t_1 - Y_{s2})^2 + (h2 - Z_{s2})^2}$$
$$\vdots$$
$$dM = \sqrt{(x1 + v_x \cdot \Delta t_M - X_{sM})^2 + (y1 + v_y \cdot \Delta t_M - Y_{sM})^2 + (h2 - Z_{sM})^2}$$
(7)

With $$\begin{cases} d1 = c \cdot (t_{r_1} - t_{t_1}) \\ \vdots \\ dM = c \cdot (t_{r_M} - t_{t_M}) \end{cases}$$

Here, we still have only two unknowns x1 and y1, but we have up to M observations. Therefore, it becomes an overdetermined system to estimate x1 and y1.

In this case, we can still apply Newton's method. First, the first order Taylor expansion at $(x1_k, y1_k)$ regarding d1 is similar to embodiments C2 as follow:

$$d1 \approx r_{1k} + \frac{x1_k - X_{s1}}{r_{1k}}(x1_{k+1} - x1_k) + \frac{y1_k - Y_{s1}}{r_{1k}}(y1_{k+1} - y1_k)$$

where $$r_{1k} = \sqrt{(x1_k - X_{s1})^2 + (y1_k - Y_{s1})^2 + (h1 - Z_{s1})^2}$$

While the remaining distances for cases 2≤m≤M are given as $$dm \approx$$
$$r_{mk} + \frac{x1_k + v_x \cdot \Delta t_m - X_{sm}}{r_{mk}}(x1_{k+1} - x1_k) + \frac{y1_k + v_y \cdot \Delta t_m - Y_{sm}}{r_{mk}}(y1_{k+1} - y1_k)$$

where $$r_{mk} = \sqrt{(x1_k + v_x \cdot \Delta t_m - X_{sm})^2 + (y1_k + v_y \cdot \Delta t_m - Y_{sm})^2 + (hm - Z_{sm})^2}$$

As a result, the Jacobian matrix will be $$G = \begin{bmatrix} \frac{x1_k - X_{s1}}{r_{1k}} & \frac{y1_k - Y_{s1}}{r_{1k}} \\ \vdots & \vdots \\ \frac{x1_k + v_x \cdot \Delta t_M - X_{sM}}{r_{Mk}} & \frac{y1_k + v_y \cdot \Delta t_M - Y_{sM}}{r_{Mk}} \end{bmatrix}$$

$$\Delta = \begin{bmatrix} x1_{k+1} - x1_k \\ y1_{k+1} - y1_k \end{bmatrix}$$

$$b = \begin{bmatrix} d1 - r_{1k} \\ \vdots \\ dM - r_{Mk} \end{bmatrix}$$

We can still use least square to calculate $$\Delta = (G^T G)^{-1} G^T b \tag{8}$$

and update the position via newton's method until converge (for example, both elements of Δ are all smaller than a certain number, say 1)

$$\begin{bmatrix} x1_{k+1} \\ y1_{k+1} \end{bmatrix} = \begin{bmatrix} x1_k \\ y1_k \end{bmatrix} + \Delta \tag{9}$$

Thus the spatial position of the ownship 120 has been determined by using the converged value $$\begin{bmatrix} x1_{k+1} \\ y1_{k+1} \end{bmatrix}.$$

Figure 10:
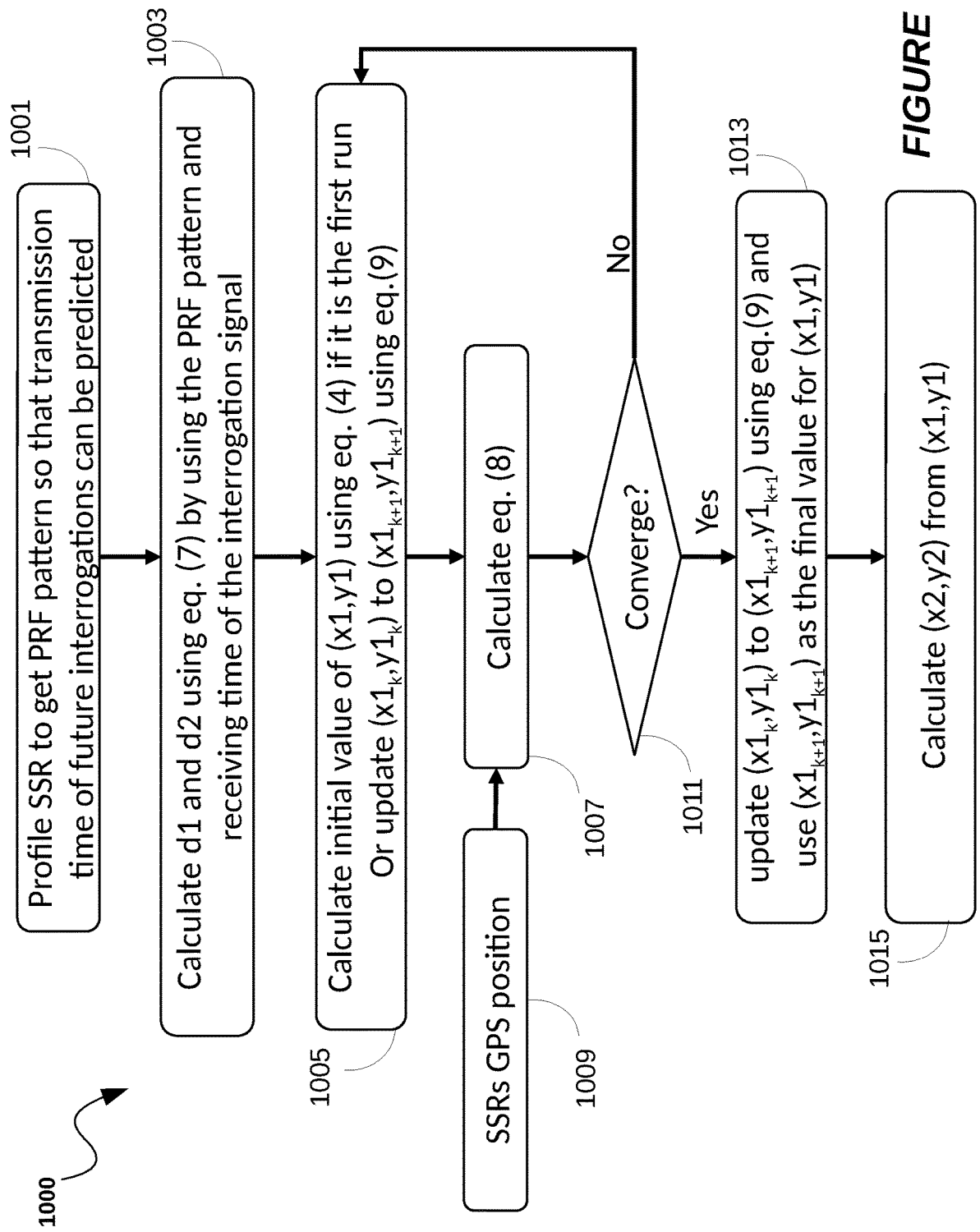
FIG. 10 illustrates an operation flow chart for embodiments of the invention involving multiple SSR.

The flow-chart illustrating the above calculation is shown in FIG. 10.

FIG. 10 illustrates an operation flow chart 1000 for embodiments of the invention involving multiple SSR. The step 1001 is to profile SSR to get PRF pattern so that transmission time of future interrogations can be predicted. Step 1003 is to calculate d1 and d2 using eq. (7) by using the PRF pattern and receiving time of the interrogation signal. Step 1005 is to calculate initial value of (x1,y1) using eq. (4) if it is the first run or update $(x1_k, y1_k)$ to $(x1_{k+1}, y1_{k+1})$ using eq.(9), then step 1007 is to calculate eq. (8), which is informed by the SSRs GPS position from step 1009. The result from step 1007 is then sent to step 1011, where a decision is made whether to converge. If "no" is decided, then the algorithm returns to step 1005. If "yes" is decided, then the algorithm proceeds to step 1013, which is to update $(x1_k, y1_k)$ to $(x1_{k+1}, y1_{k+1})$ using eq.(9) and use $(x1_{k+1}, y1_{k+1})$ as the final value for (x1,y1). Finally, the step 1015 is to calculate (x2,y2) from (x1,y1).

The methods of the embodiments of the present invention are performed by a hardware processor executing computer readable instructions stored in a computer memory, causing the hardware processor to perform the calculations according to the above noted mathematical model.

Various embodiments of the system 500 of the present invention comprise computer readable instructions stored in a memory device, causing the processor to perform calculations of the spatial position of the ownship 120 as described above.

Embodiment F (Using Angle)

As described in the previously filed U.S. patent application Ser. No. 16/276,053 filed Feb. 14, 2019 entitled METHOD AND SYSTEM FOR TRACKING OBJECTS USING PASSIVE SECONDARY SURVEILLANCE RADAR (SEA-001-US), the pointing angle of an SSR to the ownship when the ownship is interrogated can be determined.

In FIG. 6, the line indicating the moving of the aircraft can be determined by using $V_x$, $V_y$ measured by IMU as in the previous Embodiment and the altitude measured by barometer. At time t1, the pointing angle of the SSR1 can be determined by the above-mentioned patent because the ownship is interrogated at this point. This determines the line connecting SSR1 and the point at time t1. The intersection between this line and the line showing the movement direction of the ownship is the position of the ownship at time t1. Similarly, the following position at t2, t3, . . . , tm can be determined using the same way by calculating the pointing angle of the corresponding SSR. The block diagram of the processing steps is shown in FIG. 11.

Figure 11:
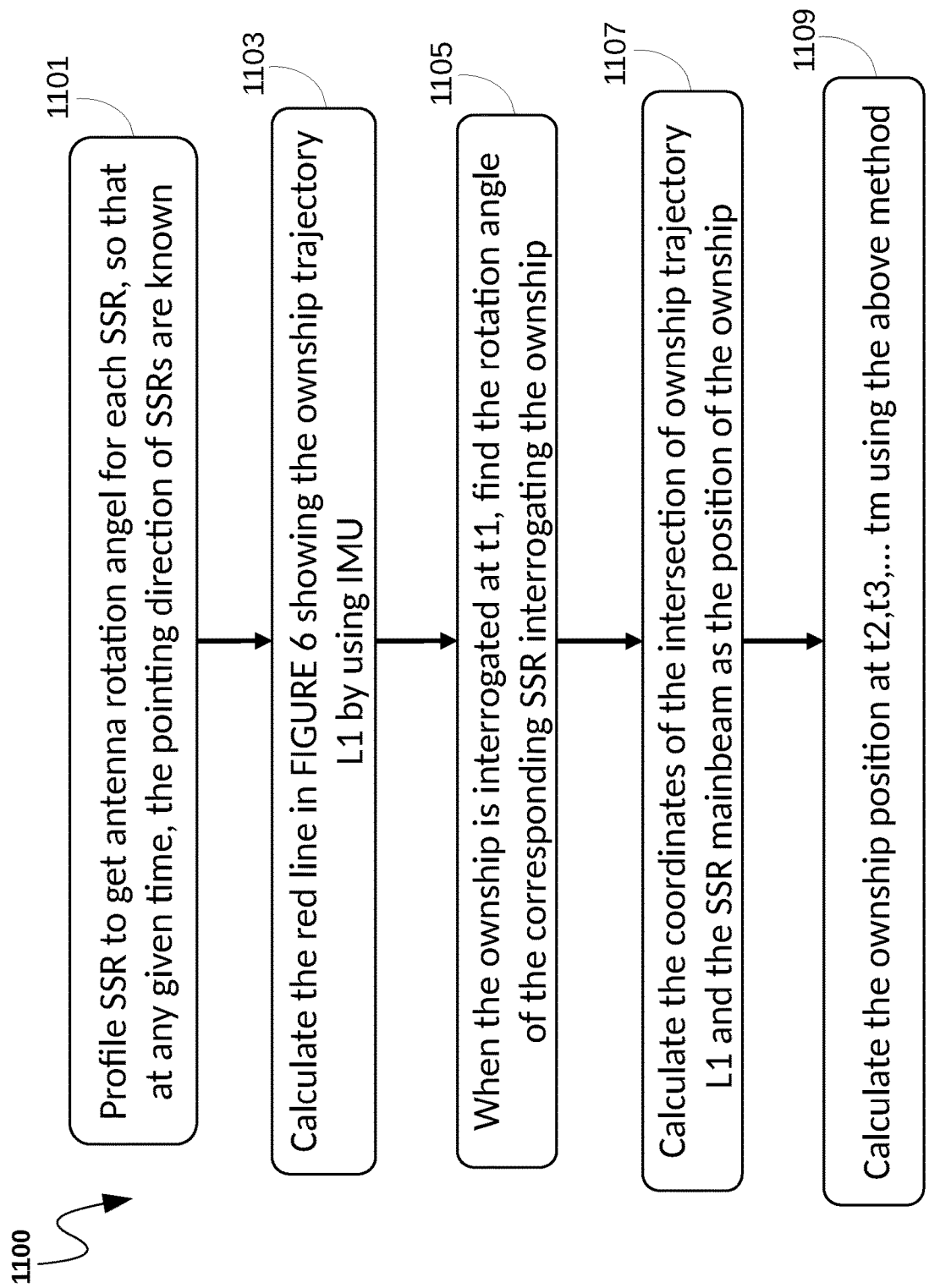
FIG. 11 illustrates an operational flow chart for an embodiment of the invention based on angle estimates.

FIG. 11 illustrates an operational flow chart 1100 for an embodiment of the invention based on angle estimates. The step 1101 is to profile the SSR to get antenna rotation angel for each SSR, so that at any given time, the pointing direction of the SSRs are known. The step 1103 is to calculate the line in FIG. 6 showing the ownship trajectory L1 by using IMU. The step 1105 is to find the rotation angle of the corresponding SSR interrogating the ownship, when the ownship is interrogates at t1. Step 1107 is to calculate the coordinates of the intersection of ownship trajectory L1 and the SSR mainbeam as the position of the ownship. Finally, the step 1109 is to calculate the ownship position at t2,t3, . . . tm using the above method.

FIG. 11 illustrates an operational flow chart 1100 for an embodiment of the invention based on angle estimates. The step 1101 is to profile the SSR to get antenna rotation angel for each SSR, so that at any given time, the pointing direction of the SSRs are known. The step 1103 is to calculate the red line in FIG. 6 showing the ownship trajectory L1 by using IMU. The step 1105 is to find the rotation angle of the corresponding SSR interrogating the ownship, when the ownship is interrogates at t1. Step 1107 is to calculate the coordinates of the intersection of ownship trajectory L1 and the SSR mainbeam as the position of the ownship. Finally, the step 1109 is to calculate the ownship position at t2,t3, . . . tm using the above method.

Embodiment G (Targets of Opportunity with Known Position)

Figure 7:
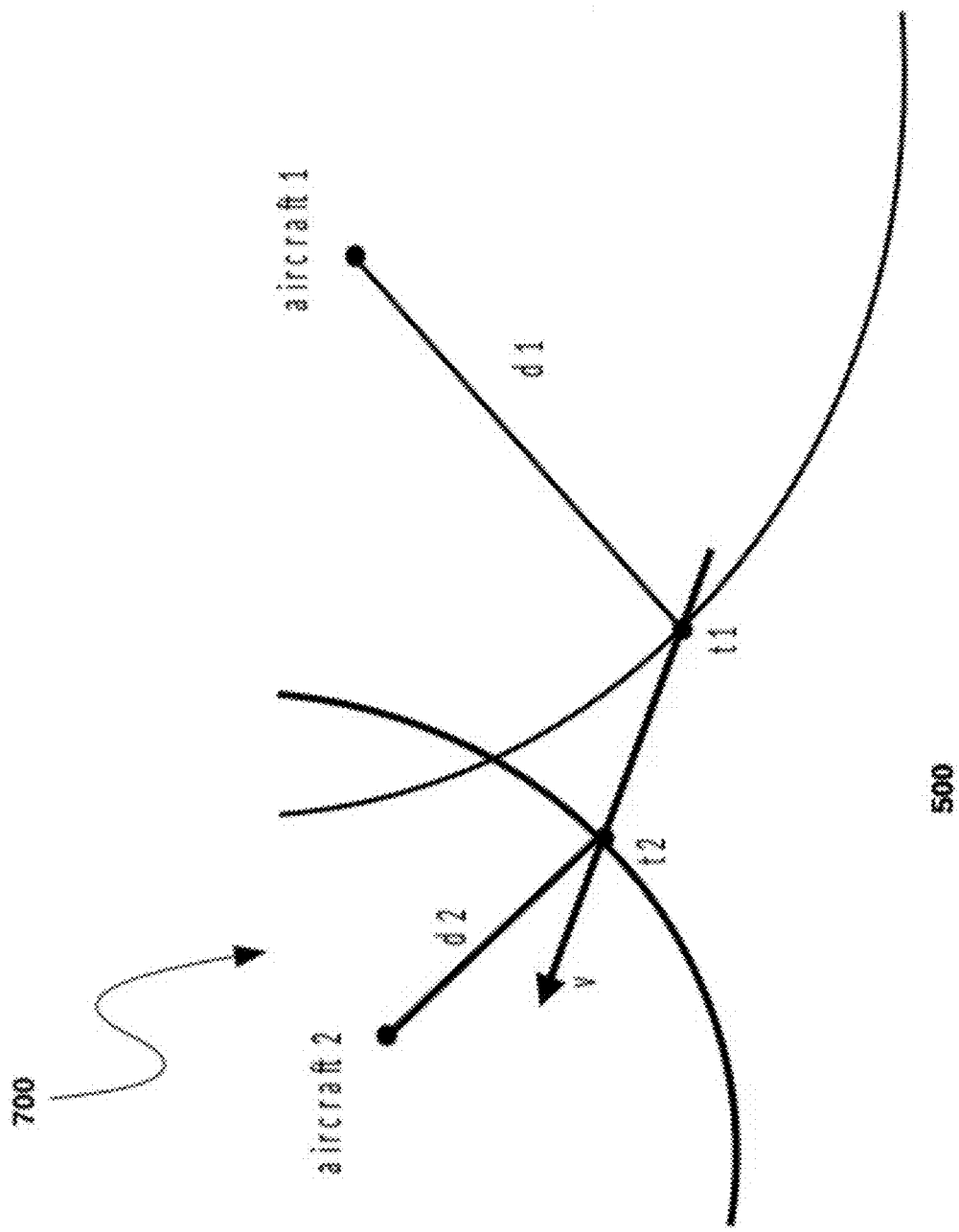
FIG. 7 illustrates an arrangement of yet another embodiment of the invention, when the signal from an SSR is blocked for an ownship, and the ownship uses targets of opportunity to calculate own position.

In this case, the interrogation signal from SSR to ownship is blocked so the ownship cannot see SSR and hence the methods mentioned in the above Embodiment do not work. However, if at least two other aircraft with known location can be found, the ownship position can also be fixed. This is shown in FIG. 7. After the position of aircraft 1 and 2 is known, assume the ownship moves at a constant speed v, the known positions of aircraft 1 and 2 are (x1,y1,z1) and (x2,y2,z2) separately.

At t1, the ownship sees aircraft1's signal, and measures a distance from aircraft1 as d1. At t2, the ownship see aircraft2's signal and measured distance from aircraft2 as d2. The two arcs in FIG. 7 are part of respective circles centred at aircraft1 and aircraft2 respectively.

Assume the unknown position of the ownship at t1 is (x,y,z), the altitude of the ownship z is known using the barometer on the aircraft. Then the position of the ownship at t2 is ((x+(t2−t1)*vx), (y+(t2−t1)*vy), (z+(t2−t1)*vz)) where vx, xy, xz are the components of v on x, y and h direction, and vx, xy, xz can be calculated by the velocity vector v (speed and heading got from the aircraft IMU).

Then we can obtain two equations:

$$\begin{cases} (x-x_1)^2 + (y-y_1)^2 + (z-z_1)^2 = d1^2 \\ (x+(t2-t1)*v_x-x_2)^2 + (y+(t2-t1)*v_y-y_2)^2 + (z+(t2-t1)*v_z-z_2)^2 = d2^2 \end{cases} \quad (10)$$

We have two unknowns (x,y) and two equations to solve the position of the ownship. Because it is a quadratic equation, we might find two solutions for the unknowns. We can then use angle of arrival or other means to eliminate one and only left with one solution. The above noted process is shown in FIG. 12.

Figure 12:
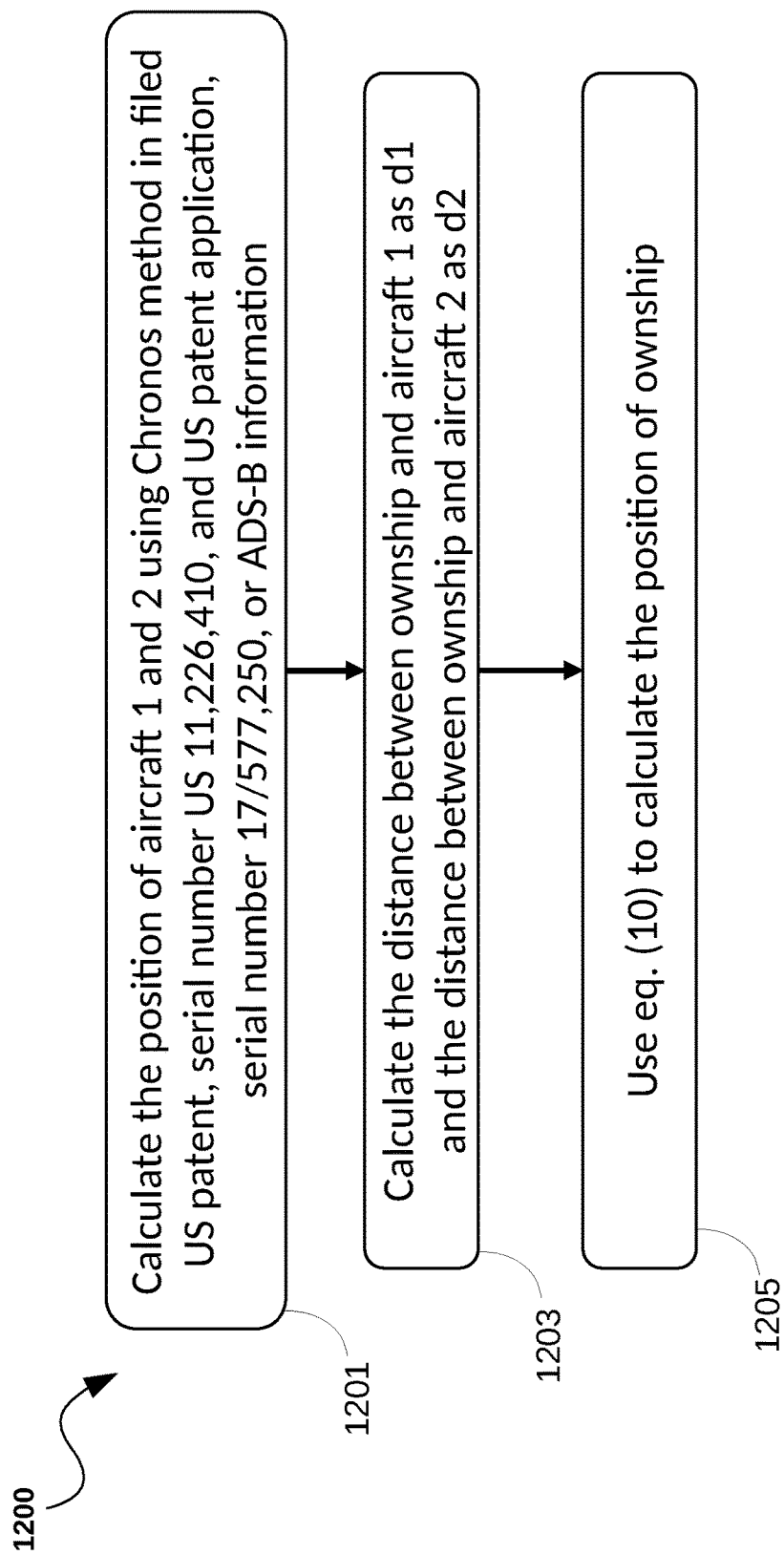
FIG. 12 illustrates an operational flow chart for an embodiment involving an airborne SSR.

FIG. 12 illustrates an operational flow chart f1200 or an embodiment involving an airborne SSR. The step 1201 is to calculate the position of aircraft 1 and 2 using methods of the previous U.S. Pat. No. 11,226,410 issued Jan. 18, 2022, and patent application Ser. No. 17/577,250 filed Jan. 17, 2022, of the same assignee, or ADS-B information. The step 1203 is to calculate the distance between ownship and aircraft 1 as d1 and the distance between ownship and aircraft 2 as d2. Finally, the step 1205 uses eq. (10) to calculate the position of ownship.

The above example is when only two aircraft is in the view of the ownship reception. When more aircraft's signal can be received by the ownship, the problem becomes overdetermined and we have more equations than the unknown variables. Therefore, we can use least square or other method to improve positioning accuracy of the ownship.

Error Analysis

In this section, we will discuss error analysis for determining X1 and Y1 in embodiments C1, C2 and E1 caused by uncertainties coming from vx and vy.

Let do first order Taylor expansion at (0,0) regarding ($2 \leq m \leq M$)-th distance $$dm(\Delta v_x, \Delta v_y) \approx rm + \frac{(x1+v_x \cdot \Delta t_m - X_{sm})\Delta t_m}{rm} \cdot \Delta v_x + \frac{(y1+v_y \cdot \Delta t_m - Y_{sm})\Delta t_m}{rm} \cdot \Delta v_y$$

where $$rm = \sqrt{(x1+v_x \cdot \Delta t_m - X_{sm})^2 + (y1+v_y \cdot \Delta t_m - Y_{sm})^2 + (hm - Z_{sm})^2}$$

Since there are uncertainties with $v_x$ and $v_y$, we assume the variance of $$\varepsilon = \frac{x1+v_x \cdot \Delta t_m - X_{sm}}{rm} \cdot \Delta v_x + \frac{y1+v_y \cdot \Delta t_m - Y_{sm}}{rm} \cdot \Delta v_y \text{ is } \sigma^2,$$

then the estimation error covariance matrix will be $$C_d = \Delta t_m \cdot \rho^2 (H^T H)^{-1}$$

Since $H^T H$ is positive-definite, the estimation errors, regarding each parameter in d, decrease when the number of columns increase in H, which is the consequence of using multiple SSRs in this case.

The estimation error also increases when the uncertainties of $v_y$ and $v_y$ increase.

The main problem is that the uncertainties of $v_x$ and $v_y$ will accumulate in different time instances. Hence, we should deal with the uncertainties and try to estimate them, which are shown in the following section.

More than 4 SSRs and Considering Uncertainty in $v_x$ and $v_y$

We consider the uncertainties in $v_x$ and $v_y$ are $\Delta v_x$ and $\Delta v_y$. In this situation, we need to estimate x1, y1, $\Delta v_x$ and $\Delta v_y$ together, otherwise, the uncertainty will accumulate at each time instant. Hence, the Jacobian matrix will be $$G = \begin{bmatrix} \dfrac{x1_k - X_{s1}}{r_{1k}} & \dfrac{y1_k - Y_{s1}}{r_{1k}} & 0 & 0 \\ \vdots & \vdots & \vdots & \vdots \\ \dfrac{x1_k + v_x \cdot \Delta t_M - X_{sM}}{r_{Mk}} & \dfrac{y1_k + v_y \cdot \Delta t_M - Y_{sM}}{r_{Mk}} & \dfrac{(x1_k + v_x \cdot \Delta t_m - X_{sm})\Delta t_m}{r_{Mk}} & \dfrac{(x1_k + v_y \cdot \Delta t_m - X_{sm})\Delta t_m}{r_{Mk}} \end{bmatrix}$$

$$\Delta = \begin{bmatrix} x1_{k+1} - x1_k \\ y1_{k+1} - y1_k \\ \Delta v_{x_{k+1}} - \Delta v_{x_k} \\ \Delta v_{y_{k+1}} - \Delta v_{y_k} \end{bmatrix}$$

$$b = \begin{bmatrix} d1 - r_{1k} \\ \vdots \\ dM - r_{Mk} \end{bmatrix}$$

We can still use least square to calculate and update the position via Newton's method until the result converges.

$$\begin{bmatrix} x1_{k+1} \\ y1_{k+1} \\ \Delta v_{x,k+1} \\ \Delta v_{y,k+1} \end{bmatrix} = \begin{bmatrix} x1_k \\ y1_k \\ \Delta v_{x,k} \\ \Delta v_{y,k} \end{bmatrix} + \Delta$$

Through calculating the uncertainties $\Delta v_x$ and $\Delta v_y$, we can calibrate $v_x$ and $v_y$ periodically. It is helpful when we estimate the position of ownship 120 at m-th time instant, i.e., $y1+v_y \cdot \Delta t_m$, by reducing the error accumulation over time.

Thus, improved methods and systems for determining the position of an aircraft using one or more SSR as beacons have been provided.

For convenience of a reader, various embodiments have been summarized below.

Various methods for determining a position of an airborne vehicle (ownship) equipped to receive signals from at least one secondary surveillance radar (SSR) has been provided. One variation of the method includes:
  (a) determining a first pulse repetition frequency (PRF) pattern for staggered interrogations of a first SSR when the position of the ownship is known (GPS signal is presented), and determining the distance from the first SSR to the airborne vehicle based on the PRF pattern after lost GPS signal;
  (b) profiling a first rotation angle of a first SSR when the position of the ownship is known, and determining the current rotation angle when SSR points to the ownship after GPS signal is lost;
  (c) determining the 3D position of the ownship using the distance and rotation angle:
  (d) determining the position of the ownship more accurately if two or more SSR are available, including:
    (i) using the distance measured from two or more SSR and the onboard IMU of ownship to determine the ownship position for best accuracy;
    (ii) using the rotation angle measured from two or more SSR and the onboard IMU of ownship to determine the ownship position;
    (iii) using the mix of distance and rotation angle measured from two or more SSR and the onboard IMU of ownship to determine the ownship position; and
  (e) determining the position of the ownship using other targets of opportunity when ownship cannot receive SSR signal, for example other aircraft in the vicinity.

The step (a) further comprises:
  during a time-window where the airborne vehicle is within a range of an antenna of the first SSR and when the ownship position is known using GPS signal:
    detecting one of: successive P1 or P3 pulses, or successive P2 pulses; forming a time-ordered sequence of intervals separating the respective successive P1 or P3 pulses, or P2 pulses;
    identifying at least two successive congruent segments of the time-ordered sequence; determining a pulse repetition pattern of P1 or P3 pulses, or P2 pulses as one of the segments subject to the constraint that a number of intervals of said one of the segments is within an initial length lower bound and a predefined length upper bound;
    deriving the first PRF pattern based on the pulse repetition pattern of P1 or P3 pulses, or P2 pulses and taking into account the interrogation mode of the first SSR;
    determine the future interrogation time of the first SSR based on the pulse repetition pattern;
  after a GPS signal is lost:
    determining the distance from the first SSR to the airborne vehicle based on the estimated/predicted transmission time and measured reception time of the interrogation.

The step (b) of the above noted method further includes:
  during a time-window where the airborne vehicle is within a range of an antenna of the first SSR when the ownship position is known using GPS signal:
    detect the time when the first SSR points to the ownship for the first time;
    detect the time when the first SSR points to the ownship for the second time;
    based on the known position of the ownship and the two times SSR points to the ownship to profile the rotation of SSR;
  after GPS signal is lost:
    determine the rotation angle of the first SSR to the airborne vehicle when the ownship is interrogated based on the profiled rotation angle of the first SSR.

The step (c) of the above noted method further comprises:
  determining a 3D position of the ownship using the distance "d", an altitude "h" and azimuth $\theta$ after the GPS signal is lost.

The step (d) (i) of the above noted method further comprises:
  when two SSRs are used, and after the GPS signal is lost:
    calculating a distance d1 from the ownship to the first SSR when the first SSR interrogates the ownship and record the current time;

calculating a distance d2 from the ownship to the second SSR when the second SSR interrogates the ownship and record the current time;

calculating the 3D position of the ownship by solving the quadratic equation groups in Embodiment C1 described above and choosing the right root;

calculating the 3D position by using the Newton's method in Embodiment C2 described above to solve the equations and choose the right root.

Alternatively, the step (d) (i) of the above noted method may include:

when multiple SSR are used, for example two or more SSR are used, and after the GPS signal is lost:

calculating distances d1, d2, . . . , dm from the ownship to the first, second, . . . , mth SSR when the SSRs interrogate the ownship and record the corresponding time;

calculating the 3D position by using the Newton's method in Embodiment E described above to solve the equations and choose the right root.

Yet alternatively, the step (d) (ii) of the method may include:

when multiple SSR are used, for example two or more SSR are used, and after the GPS signal is lost:

calculating angles $\theta 1, \theta 2, \ldots, \theta m$ from the ownship to the first, second, . . . , mth SSR when the SSRs interrogate the ownship and record the corresponding time;

calculating the 3D position by using the intersection of lines algorithm in Embodiment F.

The step (d) (iii) of the method described above includes:
when multiple SSR are used, for example two or more SSR are used, and after the GPS signal is lost:

calculating distances d1, d2, . . . , dm from the ownship to the first, second, . . . , mth SSR when the SSRs interrogate the ownship and record the corresponding time;

calculating angles $\theta 1, \theta 2, \ldots, \theta m$ from the ownship to the first, second, . . . , mth SSR when the SSRs interrogate the ownship and record the corresponding time;

calculating the 3D position by using the Newton's method or the intersection of lines algorithm;

The step (e) of the method described above includes:
before the GPS signal is lost, and in case an SSR signal is also lost:

calculating the position of an aircraft 1, and hence a distance between the aircraft 1 and the ownship;

calculate the position of an aircraft 2, and hence a distance between the aircraft 2 and the ownship;

after the GPS is lost:

solve the quadratic equation in Embodiment G for the 3D position of the ownship.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The processes described above are computationally intensive requiring the use of multiple hardware processors. A variety of processors, such as microprocessors, digital signal processors, and gate arrays, may be employed. Generally, processor-readable media are needed and may include floppy disks, hard disks, optical disks, Flash ROMS, non-volatile ROM, and RAM.

It should be noted that methods and systems of the embodiments of the invention and data sets described above are not, in any sense, abstract or intangible. It should be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable processing of data.

What is claimed is:

1. A method for determining a current position of an airborne vehicle equipped to receive signals from at least one secondary surveillance radar (SSR), the method comprising:
   (a) determining a first pulse repetition frequency (PRF) pattern for staggered interrogation pulses (P1, P2, P3) of a first SSR, including determining an interrogation mode of the first SSR and duration of the first PRF pattern;
   (b) determining a first distance from the first SSR to the airborne vehicle, comprising:
     (i) at the airborne vehicle, at a first reception time instant, receiving an interrogation signal, comprising at least one of P1, P2 or P3 pulses, from the first SSR;
     (ii) estimating a first transmit time instant of said at least one of P1, P2 or P3 pulses, based on the first reception time instant and the first PRF pattern, comprising:
       at a prior reference reception time instant of receiving a reference interrogation signal from the first SSR at the airborne vehicle, recording a reference position of the airborne vehicle from a navigation instrument and a position of the first SSR, thereby determining a distance between the SSR and the airborne vehicle, and calculating a reference time instant when the reference interrogation signal has been sent by the first SSR;
       at consecutive time instants, receiving consecutive interrogation signals from the first SSR at the airborne vehicle when the airborne vehicle is within a main lobe of the first SSR;
       determining an integer number of first PRF patterns fitting into respective time intervals between said consecutive time instants and the reference time instant, comprising determining respective remaining time intervals which are shorter than the duration of the first PRF, the remaining respective time intervals defining a fractional section of the first PRF pattern, including matching the fractional section of the first PRF pattern with the first PRF pattern;
       determining the first transmit time instant based on the integer number of first PRF patterns and said matched fractional section of the first PRF pattern; and determining said first distance, at said current position, from said first SSR according to said first transmit time, said first reception time, and the speed of light;

(c) determining other measurements required for determining the current position; and (d) determining the current position using said first distance and said other measurements.

2. The method of claim 1 wherein the step (a) further comprises:

during a time-window where the airborne vehicle is within a range of an antenna of the first SSR detecting one of: successive P1 or P3 pulses, or successive P2 pulses;

forming a time-ordered sequence of intervals separating the successive P1 or P3 pulses, or the successive P2 pulses;

identifying at least two successive congruent segments of the time-ordered sequence;

determining a pulse repetition pattern of P1 or P3 pulses, or P2 pulses as one of the segments subject to the constraint that a number of intervals of said one of the segments is within an initial length lower bound and a predefined length upper bound;

deriving the first PRF pattern based on the pulse repetition pattern of P1 or P3 pulses, or P2 pulses and taking into account the interrogation mode of the first SSR.

3. The method of claim 1, wherein the navigation instrument comprises a Global Positioning System (GPS) receiver.

4. The method of claim 1, wherein the step (c) further comprises determining said other measurements as a displacement of azimuth of said airborne vehicle at said current position with respect to the reference position as based on a known angular frequency of a respective beam of said first SSR and the time gap between said current transmit time and said reference transmit time; and an altitude of the airborne vehicle.

5. The method of claim 1, further comprising:

determining a second pulse repetition frequency (PRF) pattern for staggered interrogation pulses (P1, P2, P3) of a second SSR, including determining an interrogation mode of the second SSR;

determining a second distance from the second SSR to the airborne vehicle, comprising:

at the airborne vehicle, at a second reception time instant, receiving an interrogation signal, comprising at least one of P1, P2 or P3 pulses, from the second SSR;

estimating a second transmit time instant of said at least one of P1, P2 or P3 pulses based on the second reception time instant and the second PRF pattern, thereby determining the second distance;

determining a speed and direction of flight of the airborne vehicle between the first reception time instant and the second reception time instant; and determining the current position of the airborne vehicle, at the second reception time instant, using the first distance, the second distance, the speed and the direction.

6. The method of claim 1, further comprising:

determining a second pulse repetition frequency (PRF) pattern for staggered interrogation pulses (P1, P2, P3) of a second SSR, including determining an interrogation mode of the second SSR;

determining a second distance from the second SSR to the airborne vehicle, comprising:

at the airborne vehicle, at a second reception time instant, receiving an interrogation signal, comprising at least one of P1, P2 or P3 pulses, from the second SSR;

estimating a second transmit time instant of said at least one of P1, P2 or P3 pulses based on the second reception time instant and the second PRF pattern, thereby determining the second distance;

determining a third pulse repetition frequency (PRF) pattern for staggered interrogation pulses (P1, P2, P3) of a third SSR, including determining an interrogation mode of the third SSR;

determining a third distance from the third SSR to the airborne vehicle, comprising:

at the airborne vehicle, at a third reception time instant, receiving an interrogation signal, comprising at least one of P1, P2 or P3 pulses, from the third SSR;

estimating a third transmit time instant of said at least one P1, P2 or P3 pulses based on the third reception time instant and the third PRF pattern, thereby determining the third distance;

and determining the current position of the airborne vehicle, at the third reception time instant, using the first position distance, the second position distance, and the third position distance.

7. The method of claim 1 wherein the step (a) comprises determining the first PRF pattern based on: P1 pulses; P2 pulses; both P1 pulses and P2 pulses.

8. The method of claim 1, wherein the determining the position of the airborne vehicle is one of: a manned aircraft; and an unmanned aircraft.

9. The method of claim 1, further comprising, at the airborne vehicle:

receiving, at a second reception time instant, a transponder response from a first aircraft of a first known position having been interrogated by the first SSR;

determining a second distance between the airborne vehicle and said first aircraft;

receiving, at a third reception time instant, a transponder response from second aircraft of a second known position having been interrogated by the first SSR;

determining a third distance between the airborne vehicle and said second aircraft;

determining a speed and direction of flight of the airborne vehicle between said second reception time instant and said third reception time instant;

determining the spatial position of the airborne vehicle, at said third reception time instant, using the second distance, the third distance, the first known position, the second known position, the speed, and the direction.

10. The method of claim 1, wherein said consecutive instants follow an incidence of failure of the navigation instrument.

11. The method of claim 1, further comprising, at the airborne vehicle:

receiving, at a second reception time instant, a transponder response from a first aircraft of a first known position having been interrogated by the first SSR;

determining a second distance between the airborne vehicle and said first aircraft; and determining the current position of the airborne vehicle, at said second reception time instant, using the reference position, the second distance, the first known position, the first reception time second reception time.

12. A system for determining a spatial position of an airborne vehicle equipped to receive signals from one or more Secondary Surveillance Radars (SSRs), the system-comprising:
- a hardware processor;
- a non-transitory storage medium for storing computer executable instructions causing the hardware processor to:
  - (a) determine, for said one or more SSRs, respective pulse repetition frequency (PRF) patterns for staggered interrogation pulses (P1, P2, P3), including determining corresponding interrogation modes;
  - (b) determine respective distances from one of the one or more SSRs and at least two aircraft having respective known positions and interrogated by said one or more SSRs, to the airborne vehicle, comprising:
    - (i) receive, at the airborne vehicle, at respective reception time instants, one of:
      - respective interrogation signals, comprising at least one of corresponding P1, P2 or P3 pulses, from said one or more SSRs; and
      - transponder responses from said at least two aircraft having been interrogated by said one or more SSRs:
    - (ii) estimate respective transmit time instants of said at least one of corresponding P1, P2 or P3 pulses based on said respective reception time instants and said respective PRF patterns, thereby determining said respective distances;

and
    - (iii) determine said respective distances based on said transmit time instants, said respective reception time instants, and the speed of light;
  - (c) determine other measurements required for determining the spatial position; and
  - (d) determine the spatial position using said respective distances and said other measurements;

for said respective transmit time instants at respective reference reception time instants of receiving respective reference interrogation signals from said one or more SSRs, the computer executable instructions cause the hardware processor to:
- at the airborne vehicle, record respective positions of the airborne vehicle from a navigation instrument and respective positions of said one or more SSRs, thereby determining respective distances between said one or more SSRs and the airborne vehicle, and calculate respective reference time instants when the reference interrogation signals have been sent by said one or more SSRs;
- at respective consecutive time instants:
  - receive respective consecutive interrogation signals from said one or more SSRs at the airborne vehicle when the airborne vehicle is within respective main lobes of said one or more SSRs;
  - determine respective integer numbers of respective PRF patterns fitting into respective time intervals between said respective consecutive time instants and respective reference time instants, comprising determining respective remaining time intervals which are shorter than respective durations of the respective PRF patterns, the remaining respective time intervals defining respective fractions sections of said respective PRF patterns, including matching the respective fractional sections of the respective PRF patterns with the respective PRF patterns; and
  - determine the respective transmit time instants based on the respective integer numbers of said respective PRF patterns and said respective matched fractional sections of the respective PRF patterns.

13. The system of claim 1, wherein said one or more comprise one of:
one SSR; two SSRs; three SSRs: more than three SSRs.

14. The system of claim 1, wherein the computer executable instructions further cause the hardware processor to:
- during a time-window where the airborne vehicle is within a range of a respective antenna of said respective one or more SSRs:
  - detect one of successive P1 or P3 pulses or successive P2 pulses;
    - form a time-ordered sequence of intervals separating the successive P1 or P3 pulses, or successive P2 pulses;
    - identify at least two successive congruent segments of the time-ordered sequence;
    - determine a pulse repetition pattern of P1 or P3 pulses, or P2 pulses as one of the segments subject to the constraint that a number of intervals of said one of the segments is within an initial length lower bound and a predefined length upper bound;

and
- derive said respective PRF patterns based on respective pulse repetition patterns of P1 or P3 pulses, or P2 pulses and respective interrogation modes of said one or more SSRs.

15. The system of claim 12, wherein the computer executable instructions cause the hardware processor to determine said respective PRF patterns based on: P1 pulses; P2 pulses; both P1 pulses and P2 pulses.

16. The system of claim 12, wherein the airborne vehicle is one of: a manned aircraft; and an unmanned aircraft.

17. The system of claim 1, wherein the computer readable instructions further cause the hardware processor to:
- determine respective speeds and respective directions of flight of the airborne vehicle between said respective reception time instants; and
- determine the spatial position using the respective distances, the respective speeds, and the directions.

18. The system of claim 1, further comprising:
a navigation instrument; and
a time indicator;
wherein said consecutive instants follow an incidence of failure of said navigation instrument.

19. A module for determining a spatial position of an airborne vehicle equipped to receive signals from one or more Secondary Surveillance Radars (SSRs), the module comprising:
- a non-transitory storage medium having computer executable instructions stored thereon for execution by a hardware processor, causing the hardware processor to:
  - (a) determine, for said one or more SSRs, respective pulse repetition frequency (PRF) patterns for staggered interrogation pulses (P1, P2, P3) including determining corresponding interrogation modes of said one or more SSRs;
  - (b) determine respective distances from one of the one or more SSRs and at least two aircraft having respective known positions and interrogated by said one or more SSRs, to the airborne vehicle, comprising:
    - (i) receive, at the airborne vehicle, at respective reception time instants, one of:
      - respective interrogation signals, comprising at least one of corresponding P1, P2 or P3 pulses, from said one or more SSRs; and transponder responses from said at least two aircraft having been interrogated by said one or more SSRs;
  (ii) estimate respective transmit time instants of said at least one of corresponding P1, P2 or P3 pulses based on said respective reception time instants and said respective PRF patterns; and
  (iii) determine said respective distances based on said transmit time instants, said respective reception time instants, and the speed of light;
 (c) determine other measurements required for determining the spatial position; and
 (d) determine the spatial position using said respective distances and said other measurements;
for said respective transmit time instants at respective reference reception time instants of receiving respective reference interrogation signals from said one or more SSRs, the computer executable instructions cause the hardware processor to:
 at the airborne vehicle, record respective positions of the airborne vehicle from a navigation instrument and respective positions of said one or more SSRs, thereby determining respective distances between said one or more SSRs and the airborne vehicle, and calculate respective reference time instants when the reference interrogation signals have been sent by said one or more SSRs;
 at respective consecutive time instants:
  receive respective consecutive interrogation signals from said one or more SSRs at the airborne vehicle when the airborne vehicle is within respective main lobes of said one or more SSRs;
  determine respective integer numbers of respective PRF patterns fitting into respective time intervals between said respective consecutive time instants and respective reference time instants, comprising determining respective remaining time intervals which are shorter than respective durations of the respective PRF patterns, the remaining respective time intervals defining respective fractions sections of said respective PRF patterns, including matching the respective fractional sections of the respective PRF patterns with the respective PRF patterns; and
  determine the respective transmit time instants based on the respective integer numbers of said respective PRF patterns and said respective matched fractional sections of the respective PRF patterns.

20. The module of claim 19, wherein said one or more SSRs comprise one of:
one SSR; two SSRs; three SSRs; more than three SSRs.

21. The module of claim 19, wherein the computer executable instructions further cause the hardware processor to:
 during a time-window where the airborne vehicle is within a range of a respective antenna of said respective one or more SSRs:
 detect one of successive P1 or P3 pulses; or successive P2 pulses;
 form a time-ordered sequence of intervals separating the successive P1 or P3 pulses, or successive P2 pulses;
 identify at least two successive congruent segments of the time-ordered sequence;
 determine a pulse repetition pattern of P1 or P3 pulses, or P2 pulses as one of the segments subject to the constraint that a number of intervals of said one of the segments is within an initial length lower bound and a predefined length upper bound; and
 derive said respective PRF patterns based on respective pulse repetition patterns of P1 or P3 pulses, or P2 pulses and respective interrogation modes of said one or more SSRs.

22. The module of claim 19, wherein the computer readable instructions further cause the hardware processor to:
 determine respective speeds and respective directions of flight of the airborne vehicle between said respective reception time instants; and
 determine the spatial position using the respective distances, the respective speeds, and the directions.

23. The module of claim 19, wherein said consecutive instants follow an incidence of failure of said navigation instrument.

* * * * *